US010867269B2

(12) United States Patent
Grady Smith et al.

(10) Patent No.: US 10,867,269 B2
(45) Date of Patent: Dec. 15, 2020

(54) SYSTEM AND METHODS FOR PROCESSING INFORMATION REGARDING RELATIONSHIPS AND INTERACTIONS TO ASSIST IN MAKING ORGANIZATIONAL DECISIONS

(71) Applicant: NetSuite Inc., San Mateo, CA (US)

(72) Inventors: Celestine Star Grady Smith, Redwood City, CA (US); Douglas P. Solomon, Burlingame, CA (US); Joseph Fung, Waterloo (CA); Donna Fung, Waterloo (CA); Simon Clark, San Mateo, CA (US); Oleksiy Ignatyev, Belmont, CA (US); Mihail Mihaylov, Brisbane, CA (US)

(73) Assignee: NETSUITE INC., San Mateo, CA (US)

( * ) Notice: Subject to any disclaimer, the term of this patent is extended or adjusted under 35 U.S.C. 154(b) by 1082 days.

(21) Appl. No.: 15/134,099

(22) Filed: Apr. 20, 2016

(65) Prior Publication Data
US 2017/0236081 A1 Aug. 17, 2017

Related U.S. Application Data

(60) Provisional application No. 62/154,411, filed on Apr. 29, 2015.

(51) Int. Cl.
*G06Q 10/06* (2012.01)

(52) U.S. Cl.
CPC ....... *G06Q 10/0637* (2013.01); *G06Q 10/067* (2013.01)

(58) Field of Classification Search
None
See application file for complete search history.

(56) References Cited

U.S. PATENT DOCUMENTS

| 6,904,449 | B1 | 6/2005 | Quinones |
| 8,200,527 | B1 | 6/2012 | Thompson et al. |
| 9,208,474 | B2 | 12/2015 | Mckeown et al. |
| 9,733,921 | B1 | 8/2017 | Saenz et al. |
| 9,817,991 | B2 | 11/2017 | Boncha et al. |

(Continued)

*Primary Examiner* — Alan S Miller
*Assistant Examiner* — Arif Ullah
(74) *Attorney, Agent, or Firm* — Kraguljac Law Group, LLC

(57) ABSTRACT

A system and methods for generating an interaction-weighted visualization of an organization or group, with the relationships between members being based on or weighted by the amount, type, degree, or significance of interactions between them and the flow of communications between members, etc. In some embodiments, this may have the form of a tree structure with nodes representing employees being connected by branches. The size, color, or number of branches may indicate characteristics of the interactions between the connected nodes (e.g., the frequency, importance, or topic of the interactions, etc.). For some purposes this provides a more accurate and realistic view of how information and communications move within an organization. It may also be used to provide insight into the strength of certain relationships, the degree of involvement of certain people or groups in implementing policies or in making decisions, or the relative importance of certain communication channels.

24 Claims, 15 Drawing Sheets

(56) References Cited

U.S. PATENT DOCUMENTS

| | | | |
|---|---|---|---|
| 2008/0243581 A1* | 10/2008 | Jennings | G06Q 30/0203 |
| | | | 705/7.12 |
| 2010/0100427 A1* | 4/2010 | McKeown | G06Q 10/067 |
| | | | 705/322 |
| 2013/0212479 A1* | 8/2013 | Willis | G06Q 10/10 |
| | | | 715/736 |

* cited by examiner

… (1)

SYSTEM AND METHODS FOR PROCESSING INFORMATION REGARDING RELATIONSHIPS AND INTERACTIONS TO ASSIST IN MAKING ORGANIZATIONAL DECISIONS

CROSS REFERENCE TO RELATED APPLICATION

This application claims priority from U.S. provisional patent application No. 62/154,411, entitled System and Methods for Processing Information Regarding Relationships and Interactions to Assist in Making Organization Decisions," filed Apr. 29, 2015, which is incorporated by reference herein in its entirety (including the Appendix) for all purposes.

BACKGROUND

Embodiments of the invention are directed to System and Methods for determining and using information about relationships and/or interactions between members of a group or organization to determine organizational characteristics that may be helpful in making decisions regarding one or more of (a) promotions, (b) selection of an employee for a particular task, (c) identifying employees who may be more likely to leave an organization, (d) determining how best to implement a policy or strategy, etc.

Conventional representations of organizational structure are limited in their utility if there is interest in an aspect of the organization other than the reporting structure. In some cases, a conventional organizational structure may in fact present a misleading indication of the expertise or importance of a particular employee with regards to a specific task or project. Further, conventional analytical methods for evaluating employee-specific data in order to make operational decisions are typically based on a statistical analysis of events related to the employee, such as sick days, coarse productivity metrics, etc. and the application of a rule or heuristic to identify at-risk employees or those of interest for another reason. While useful in some cases, these methods are by necessity very general and typically not applicable for making other types of operational or management decisions.

Embodiments of the invention are directed toward solving the noted problems with regards to the construction and use of organizational representations, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention may be used to access, track, and analyze various types of organizational interactions (primarily interactions that involve participation or communication) to (1) develop a visual representation of the structure of an organization, based at least in part on the interactions, communications, and processes within the organization, where the representation may be used to more efficiently and accurately determine the flow of information and decision making within the organization; and (2) use the results of evaluating and analyzing interaction data and/or the visual representation to assist in making decisions for purposes of one or more of organizational planning, employee or project management, creating a more efficient flow of communications, task assignment, or employee development.

In some embodiments, the invention provides a novel, interaction-weighted visualization of an organization or group, with the relationships between members being based on or weighted by the amount, type, degree, or significance of interactions between them and the flow of communications between members, etc. In some embodiments, this may have the form of a tree structure with nodes representing employees being connected by branches. The size, color, or number of branches may indicate characteristics of the interactions between the connected nodes (e.g., the frequency, importance, or topic of the interactions, etc.). For some purposes this provides a more accurate and realistic view of how information and communications move within an organization. It may also be used to provide insight into the strength of certain relationships, the degree of involvement of certain people or groups in implementing policies or in making decisions, or the relative importance of certain communication channels (formal or informal).

This is in contrast to traditional or conventional visualizations of organizational structures, which are typically based on the management or reporting hierarchy, with employees or groups (represented by nodes) being connected by reporting lines to create a tree-like representation of the organization, with the nodes at one level being placed into a lower or higher hierarchy than the nodes at an adjacent level. While such types of organizational representations/structures provide an indication of reporting lines and/or decision making authority, they do little to indicate relative knowledge or familiarity with a task or project, or an ability to formulate or institute a change within the organization. For example, conventional representations of an organization do not provide insight into how the individual members of an organization, or how the larger teams, departments, subsidiaries or countries, interact with each other or formulate policies, share information, etc.

As recognized by the inventors, by evaluating and analyzing interactions such as emails, meetings, events, and other business related-interactions, it is possible to generate an organizational representation/structure where individuals or groups are connected by shared experiences and/or knowledge. Further, the type and frequency of interactions can be used to further define the strength or weights of connections and provide insight into certain operational aspects of the organization. This can be used to improve decision making with regards to task assignment, employee retention, employee promotions, implementations of new policies or strategies, identification of candidates for leadership positions, etc.

As noted, the inventive interaction-based representation/structure is not only a novel way of visualizing an organization, it also can be used to gain a greater understanding of the flow of information and the execution path of processes within the organization. Note that each individual interaction is part of a larger process flow for the organization. By tracking certain attributes of interactions (e.g., the topic of a meeting, the time/date, those invited, those choosing to attend, other interactions of those invited, and any related records), and applying suitable filters to an interaction-based organizational structure, a set of maps or models of the information or process flow within the organization can be created. This provides insight into how a business operates and how processes in the organization are executed through the cumulative efforts of individual interactions.

As also recognized by the inventors, by accessing, processing, and evaluating data related to the interactions between employees, insight may be gained into the actual or functional operations of an organization that may not be apparent from a traditional organizational structure or employee listing. By applying suitable analytical methods and decision processes, such information may be used to improve decision making within an organization with regards to promotions, employee churn, the selection of an appropriate employee for a specific task, identification of an employee demonstrating leadership or management qualities, preferred practices for instituting new policies, etc.

In one embodiment, the invention is directed to a method for assisting in making organizational decisions, where the method includes:

identifying one or more sources of information regarding interactions between a first employee and one or more other employees of an organization;

accessing the one or more sources of information and identifying data for further analysis and evaluation;

processing at least some of the identified data to determine one or more characteristics of the interactions between the first employee and the one or more other employees;

applying a data analysis, modeling, or decision process to the determined characteristics to identify an employee or employees that are most likely to have, or be associated with, a desired characteristic or would be expected to be in possession of a specific item of information, wherein such an employee or employees are those that either attended a meeting where certain projects or tasks were discussed, interacted with one or more persons who attended the meetings, or was made aware of aspects of a project or task of interest to the user; and based on the data analysis, modeling, or decision process, identifying one or more indicators of suggested organizational actions or potential concerns.

In another embodiment, the invention is directed to a data processing system, where the system includes:

a data storage element;

a processor programmed with a set of instructions, wherein when executed by the processor, the instructions cause the system to identify one or more sources of information regarding interactions between a first employee and one or more other employees of an organization;

access the one or more sources of information and identifying data for further analysis and evaluation;

process at least some of the identified data to determine one or more characteristics of the interactions between the first employee and the one or more other employees;

apply a data analysis, modeling, or decision process to the determined characteristics to identify an employee or employees that are most likely to have, or be associated with, a desired characteristic or would be expected to be in possession of a specific item of information, wherein such an employee or employees are those that either attended a meeting where certain projects or tasks were discussed, interacted with one or more persons who attended the meetings, or was made aware of aspects of a project or task of interest to the user; and based on the data analysis, modeling, or decision process, identifying one or more indicators of suggested organizational actions or potential concerns.

In yet another embodiment, the invention is directed to one or more non-transitory computer-readable medium on which are included a set of computer-executable instructions, which when executed by a suitably programmed electronic processing element implement a method for assisting in making organizational decisions, the method comprising:

identifying one or more sources of information regarding interactions between a first employee and one or more other employees of an organization;

accessing the one or more sources of information and identifying data for further analysis and evaluation;

processing at least some of the identified data to determine one or more characteristics of the interactions between the first employee and the one or more other employees;

applying a data analysis, modeling, or decision process to the determined characteristics to identify an employee or employees that are most likely to have, or be associated with, a desired characteristic or would be expected to be in possession of a specific item of information, wherein such an employee or employees are those that either attended a meeting where certain projects or tasks were discussed, interacted with one or more persons who attended the meetings, or was made aware of aspects of a project or task of interest to the user; and based on the data analysis, modeling, or decision process, identifying one or more indicators of suggested organizational actions or potential concerns.

Other objects and advantages of the present invention will be apparent to one of ordinary skill in the art upon review of the detailed description of the present invention and the included figures.

BRIEF DESCRIPTION OF THE DRAWINGS

Note that the same numbers are used throughout the disclosure and figures to reference like components and features.

DETAILED DESCRIPTION

Figure 1:
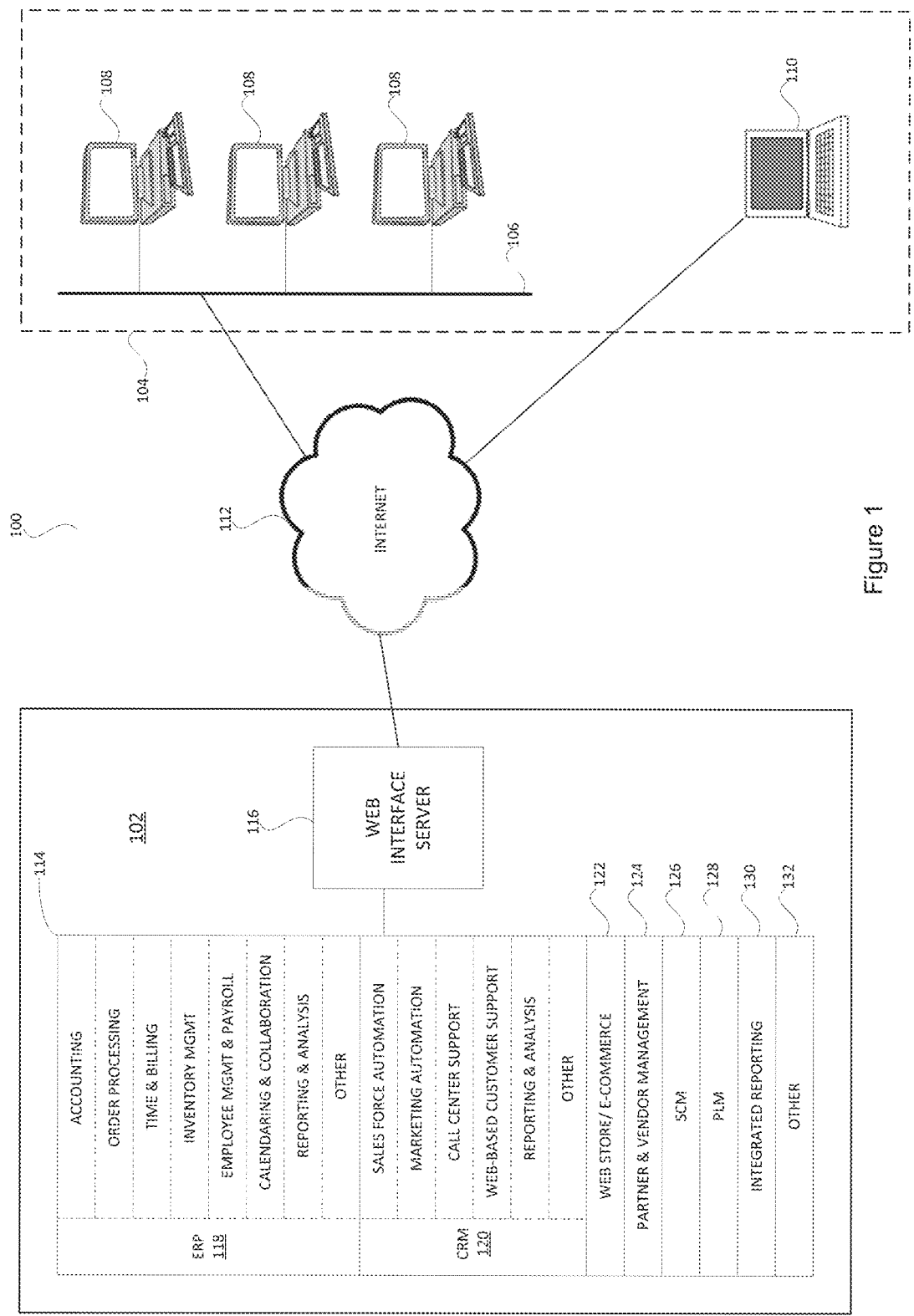
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention may be used to access, track, and analyze various types of organizational interactions (where those interactions are those which primarily involve participation or communication) in order to (1) develop a visual representation of the operational or functional (as opposed to strictly title or hierarchical position based) structure of an organization, based at least in part on the interactions, communications, and processes within the organization, where the representation may be used to more efficiently and accurately determine the flow of information and decision making processes within the organization; and/or (2) use the results of evaluating and analyzing interaction data and/or the visual representation to assist in making decisions for purposes of one or more of organizational planning, employee or project management, creating a more efficient and effective flow of communications, creating a more efficient and effective decision making process, task assignment, or employee development, among other possible uses and benefits.

In some embodiments, the invention provides a novel, interaction-weighted visualization of an organization or group, with the relationships between members being based on, or weighted by, the amount, type, subject matter, degree, or significance of interactions between them and the flow of communications between members, etc. In some embodiments, this may have the form of a tree structure with nodes representing employees being connected by branches. The size, color, or number of branches may indicate characteristics of the interactions between the connected nodes (e.g., the frequency, importance, or topic of the interactions, etc.). For some purposes this provides a more accurate and realistic view of how information and communications move within an organization. It may also be used to provide insight into the strength of certain relationships, the degree of involvement of certain people or groups in implementing policies or in making decisions, or the relative importance of certain communication channels (where those may be formal or informal).

As recognized by the inventors, by evaluating and analyzing interactions such as emails, meetings, attendance at events, and other business related-interactions, it is possible to generate an organizational representation/structure where individuals or groups are connected by shared experiences and/or knowledge. Further, the type and frequency of interactions can be used to further define the strength or weights of connections and provide insight into certain operational aspects of the organization. This can be used to improve decision making with regards to task assignment, employee retention, employee promotions, implementations of new policies or strategies, identification of candidates for leadership positions, etc.

As noted, the inventive interaction-based representation/structure is not only a novel way of visualizing an organization, it also can be used to gain a greater understanding of the flow of information and the execution path of decision processes within the organization. Note that each individual interaction is part of a larger process flow for the organization. By tracking certain attributes of interactions (e.g., the topic of a meeting, the time/date, those invited, those choosing to attend, other interactions of those invited, and any related records), and applying suitable filters to an interaction-based organizational structure, a set of maps or models of the information or process flow within the organization can be created. This provides insight into how a business operates, how processes in the organization are executed, and how policies are implemented through the cumulative effect of multiple individual interactions.

In addition, by accessing, processing, and evaluating data related to the interactions between employees, insight may be gained into the actual or functional operations of an organization that may not be apparent from a traditional organizational structure or employee listing. By applying suitable analytical methods and decision processes, such information may be used to improve decision making within an organization with regards to promotions, employee churn, the selection of an appropriate employee for a specific task, identification of an employee demonstrating leadership or management qualities, preferred practices for instituting new policies, etc.

Network Models of Organizations

Figure 5:
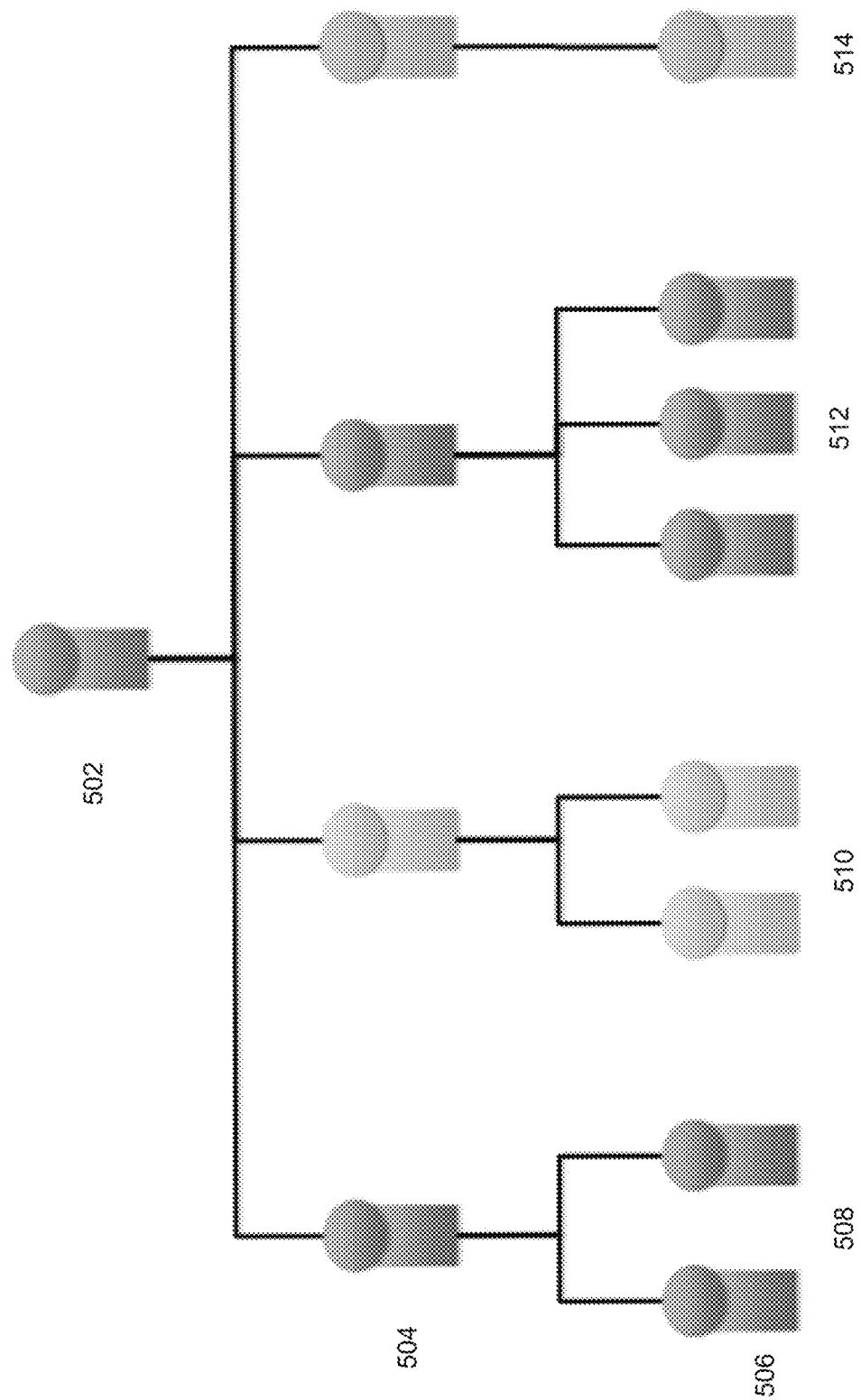
FIG. 5 is a diagram illustrating a conventional organization chart based on role or reporting hierarchy.

In some organizations or groups, a network model of people and interactions may be developed and used for analysis of the operations of the organization or group. In such models, individuals or groups may be indicated as a "node" with nodes being separated by "paths" or links. The paths or links can be chosen to represent an attribute (such as a type or level of interactions). Based on the attribute represented by a link, a metric may be developed that can be used to characterize the relationship between two nodes (such as a measure of "distance", a magnitude of the difference in the value of a parameter between two nodes, etc.). For example, network models of an organization may include:

Hierarchical Models—a structure defined by leaders/managers and subordinates, with a one-to-many relationship (typically one manager will have multiple subordinates). Reporting lines define the connections between individuals (an example of which is shown in FIG. 5);

Functional Models—a structure defined by grouping individuals based on the primary function they perform in the organization. (i.e., Accounting, Development, Legal, Manufacturing, etc.); and Matrix/Project Based Models—a structure based on organizational goals or projects. Cross-functional individuals are grouped by projects they are working on and a project manager has authority over a group assigned to a project.

As recognized by the inventors, interactions (the occurrences of communication, participation, and shared information between two or more individuals or groups) often follow a very different type of network structure than the structures formally recognized by the organization. The network of interactions (including emails, comments, formal or informal meetings, discussions, and conversations) can cross project, functional and hierarchical paths, bridging individuals from different groups and jumping over levels of management (i.e., communication between a senior leader and their 4th level report). Lines and structures of interaction are fluid and dynamic, often arising out of necessity and evolving with the needs and operations of an organization. In that sense, such interactions and the networks in which they occur provide a more accurate representation of the current state of interactions, decision making, and communications flow within an organization (as opposed to that which might be assumed based on a conventional organization structure or chart). As such, these interactions and ad hoc networks may provide a basis for identifying interaction patterns that are indicative of potential problems (churn, a failure to implement a desired policy, etc.), that reflect how certain goals were accomplished or metrics improved, or that suggest how efficiencies or other desired goals might be achieved by varying existing relationships or policies, etc.

General Architecture and Operation

A general implementation of an embodiment of the inventive system and methods may include components, elements, and processes that operate individually or in combination to provide:

A data acquisition, processing, and storage sub-system configured for use in acquiring and processing interaction and participant information for an organization, from sources including (but not limited to, or required to include) email, voice mail, call records, text messages, calendaring or event information, task records, time entry records, etc.;

A process or method for generating a visualization/representation of an organization's communications, information and process flows (based on and using the interaction and participant information). The visualization or representation may include an indication of the relative strength or importance of a particular flow or relationship. This indication may be based on the number of interactions, the frequency of interactions, the category or subject matter of the interactions, or another characteristic of the interactions. The indication may be based on a metric related to interactions/ information flow. An example of such a visualization is a network model of employees/nodes and one or more types of connecting attributes between the nodes. These connecting attributes may include aspects such as communication/information flows, relative involvement in a project, the number of contacts/interactions, the relative value of an interaction to a specified decision process, an indication of regular contacts, contacts in a specified group, reporting relationships, position in a role-based hierarchy, etc.;

A process or method for implementing one or more of statistical, machine learning based, rule based, filtering, or other form of data analysis on the interaction and participant information, and for assisting in making decisions relevant to an organization (e.g., generating recommendations, generating probabilities of success, assigning a "cost" or "value" to a possible decision, etc.) based on that data analysis; and A process or method for comparing a conventional or current organizational chart or arrangement (such as one based on role or reporting structure) with the visualization/representation of an organization's information and process flows (as appropriately filtered or analyzed) in order to identify differences between the actual (or most effective) and the expected (or desired) flow of information, interactions, or decision making responsibility within the organization. This may be of assistance in identifying a preferred reporting arrangement, a more effective information distribution channel, a possible explanation for why a policy was or was not successfully implemented, etc.

The employee interaction related data or information that may be accessed and processed as part of implementing an embodiment of the inventive system and methods may include (but is not required to include, nor are other sources or types of data excluded from consideration) information regarding:

The Hierarchy of roles within the organization;
Department/Group Structures (the identification and purpose/task/goals of such structures);
Performance Metrics (individual and group);
Attendance rate, types of interactions participated in, types declined by a person or group member;

Productivity (based on macro and micro characteristics, and as related to an individual and/or group);

Information about Individuals (e.g., age, race, gender, location/country, department, team, tenure, education, salary, etc.);

Hiring/Retention/Turnover rates (as segmented by project, task type, department, etc.);

Financial Data & Company Performance (short term, long term, over a defined interval);

Company events invited to, events attended, and the nature of an event;

Company goals that employee assisted in achieving;

Degrees of separation of a person from a specific level or levels of management;

Frequency of interactions between specific people or groups of people;

Types of meetings a person is invited to/not invited to; or

The timing of certain types of communications relative to an event or discovery of certain information (this may be indicative of the relative significance certain individuals have in the transmission of information within an organization).

In some embodiments, data regarding events, interactions, communications, etc. may be obtained from one or more of calendaring systems, human resources systems, email systems, phone systems, travel planning systems, event planning systems, organization performance or management systems (such as inventory, financials, accounting, etc.), or other relevant source of information about an organization, its performance, or its employees. This data may then be processed and analyzed using one or more suitable techniques or methods. Such techniques or methods may include, but are not limited to (or required to include):

Machine Learning (neural networks, goal driven models, etc.);

Statistical Analysis (to determine relevant correlations, etc.);

Application of a suitable filter, threshold, rule, or heuristic; or

Pattern recognition/matching.

In a typical use case, by determining the employee(s) that are most often involved with or associated with the following categories of activities within an organization, an embodiment of the inventive system and methods may be used to identify the appropriate or "best" person or "next best" person to contact regarding a specific issue or task. This may be important in the situation where the regular point of contact (such as a project manager or key investigator) is unavailable due to illness, travel, or because they discontinued their employment:

invitations to and/or attendance at certain types of meetings;

discussions of certain topics/policies;

participation in certain decisions;

interactions with certain personnel; or communications or interactions with certain groups of people, or with regards to certain tasks or initiatives.

Embodiments of the inventive system and methods can increase the efficiency of communications within an organization by focusing efforts on the people most likely to be in possession of needed information or skill sets, instead of moving through a conventional organizational chart in an effort to find the correct person for a task. This results from using the inventive system and methods to more efficiently and accurately identify those people and interactions that represent greater knowledge or involvement with certain information or tasks.

In some embodiments, one or more data sources (such as the employee interaction related data or information listed previously) may be accessed in order to identify data or information related to the categories or topics of interest to a user (such as the categories of interactions, activities, or events within an organization). The desired data or information may be identified on the basis of one or more of keywords, tags, rules, or other suitable method or process. The identified data or information may then be processed using one or more data analysis/decision making techniques (such as the data processing or analysis techniques described previously). An output of applying such a technique or method is typically a model or other indication of the relationship or significance of a type of data to an event, person, or decision.

For example, by applying a form of machine learning (either supervised or unsupervised) to data regarding the invitees and the attendees to a series of meetings discussing a specific topic, it may be possible to identify those most involved with certain aspects of the project discussed at the meetings. It may also be possible to identify a small set of employees that are deemed most essential for the meetings (e.g., because they are generally associated with obtaining a consensus regarding a policy or decision), even if that set differs for those "required" for attendance. It may also be possible to construct "predictive" models that are capable of identifying an employee that has become less engaged with their job, an employee that is showing an interest in certain projects (including some to which they may not be presently assigned), an employee that would be the "best" source of information about what was discussed at a meeting, etc. One or more of these capabilities may be based on identifying a collection of attributes common to an employee that resigns, common to an employee that appears disengaged from their responsibilities, or appear to be part of an informal decision process that occurs within the organization, etc.

In some embodiments, a decision process may depend, either directly or indirectly, on certain operational metrics of an organization. For instance, the selection of the "best" employee for a specific task may depend upon that employee's role, productivity, their group's successful completion of a segment of a project, the status of another project within the organization, etc. Another example is in a services organization, as when forming a team to work on a client project. Typical best practices would consider those employees with necessary skills, and ideally experience with the customer. However, an embodiment of the inventive system and methods may identify/uncover employees that attended meetings and collaborated heavily with this customer even though they weren't officially on the previous project plan, or may identify employees that are able to exert a significant influence on the performance of other desired team members for the project. Thus, in such a situation, the invention may operate to uncover additional resources or resources that increase the likelihood of the project being a success.

As noted, the accessed data may be used as an input or inputs to one or more data analysis methods or techniques. These methods or techniques may include one or more of statistical analysis, machine learning, pattern matching, application of criteria or rules, filtering, etc. The outputs of the data analysis or modeling may be used to construct a representation of the organizational structure in terms of one or more of its interactions, information flow, or relationships. The outputs of the data analysis or modeling may also (or instead) be used as raw data for a decision process (based on the relationships, correlations, and associations found as a result of the data analysis, some of which might not otherwise be evident).

In some cases, the data used as an input to either the analysis and/or decision process may include data values associated with a specific account maintained on a single or multi-tenant platform or dedicated business data processing system, such as real-time values of sales, sales velocity, revenue, profit, employee count, number of transactions processed, transaction processing rate, inventory levels, number of sales leads, degree of completion of certain tasks or goals, etc. This permits associations between certain operational states and certain communications and/or communicators to be identified. For example, analyzing information about sales or sales trends may suggest that when sales approach certain values (or fail to), certain types of interactions are more prevalent. Or, that a certain interaction channel becomes dominant, thereby suggesting that certain employees may be of greater importance to making decisions regarding those issues than would otherwise be indicated.

In some embodiments one or more forms of data recognition, data conversion, or information extraction may be used to identify and process interaction data. The form of data recognition, data conversion, or information extraction may depend upon the mode of the raw data (video, audio, or text) and the mode in which data is processed and used by a decision process. Thus, in some embodiments, a form of natural language processing (NLP) may be used to interpret the meaning of text and identify the subject matter of the text, an audio file may be converted to text using a speech-to-text conversion technique, or an image processing technique may be used to identify the participants at a meeting or to better understand a task being discussed.

Although an embodiment of the inventive system and methods may be implemented as part of, or in association with, a system or application that has access to one or more of contact, email, messaging, event planning, calendar, or voice communications data, an embodiment may also be implemented in the context of other types of organizational structures or data. This includes as part of, or in association with, sources of human resources data, health insurance data, organization financial performance data, sales representative data (CRM, etc.), etc. In such implementations, the inventive processes and methods may be part of a larger organization information processing function.

For example, in some embodiments, the invention may be implemented in the context of a multi-tenant, "cloud" based environment (such as a multi-tenant business data processing platform), typically used to develop and provide web services and business applications for end users (such as multiple businesses, organizations, groups, projects, etc.). This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected; each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to supporting one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
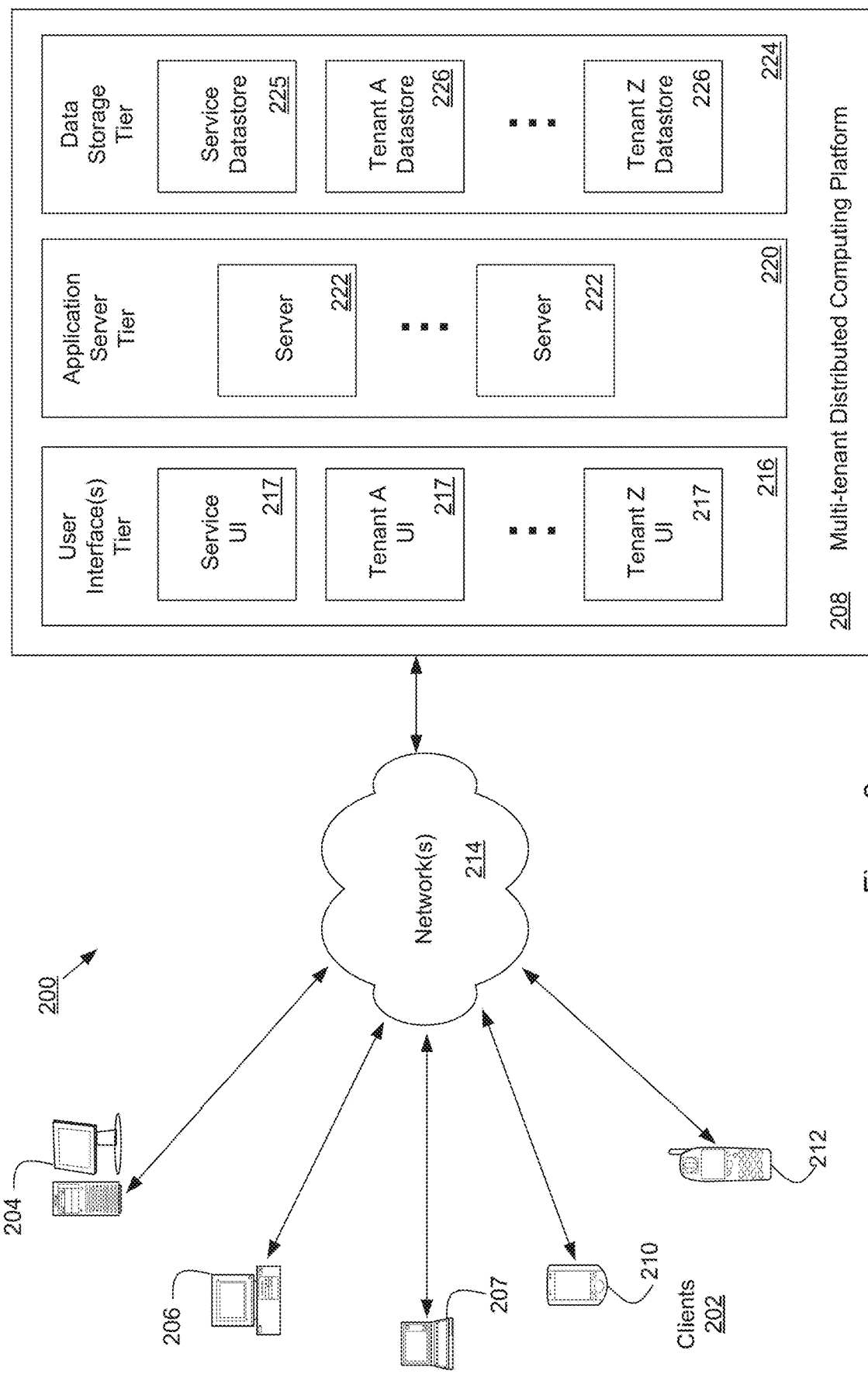
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or platform administrator to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to supporting one or more software applications or services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as the functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
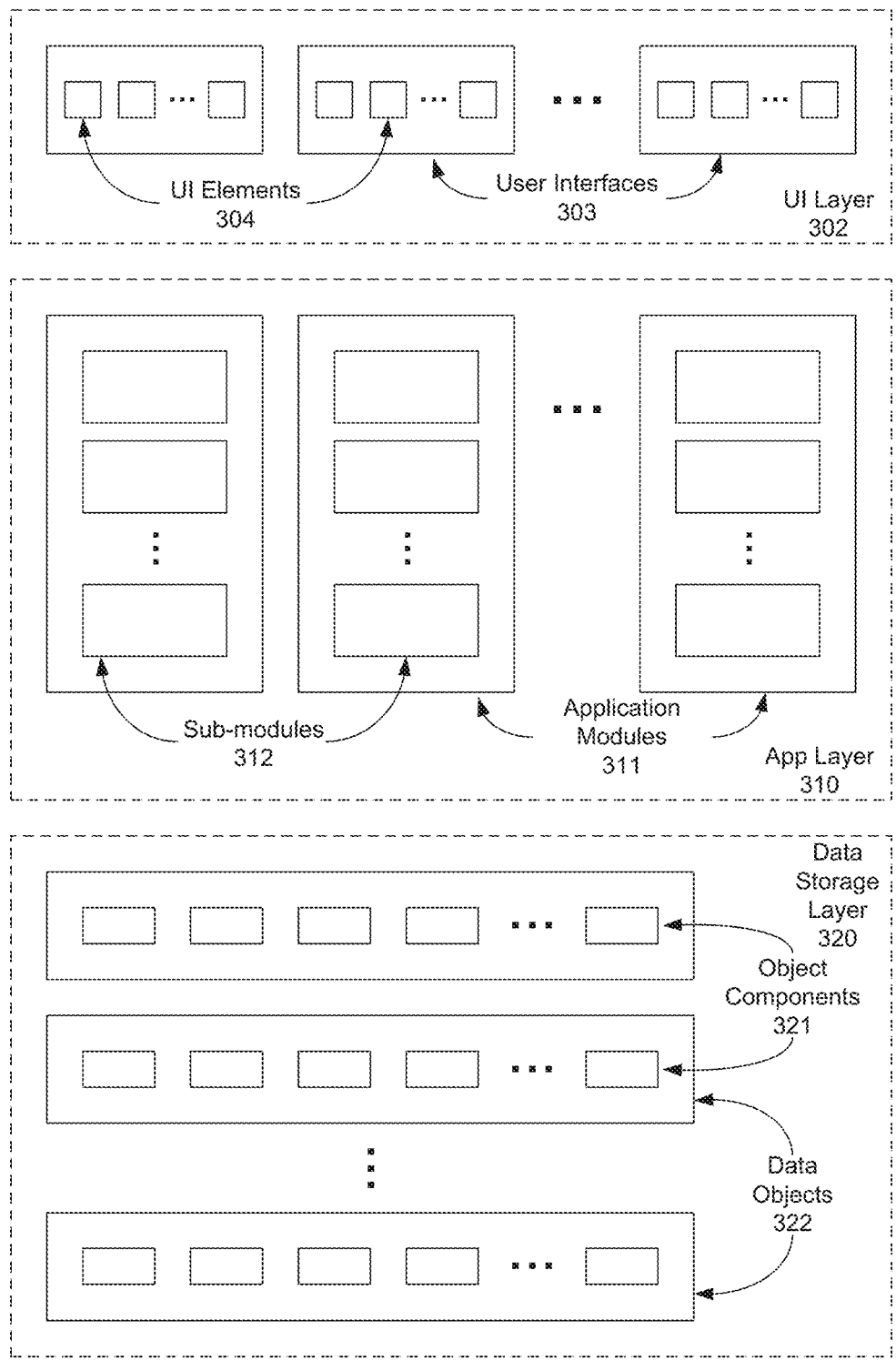
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. As described herein, embodiments of the invention provide a method for configuring aspects of a user interface (such as the data entry fields of a form) by specifying one or more user interface elements to present to a specified user.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

Permitting a user to identify one or more sources of potentially relevant information, based on key words and/or organization-specific information;

Accessing the user identified source(s) of information and/or other sources such as email systems, calendaring applications, human resources systems, accounting systems, financial records, news sources, social networks, inventory levels, sales records, etc.;

Processing the accessed data to determine one or more characteristics of the interactions between a specified employee and one or more other employees, groups, departments, projects, tasks, or other aspects of the organization;

Based on the processed data, applying a data analysis, modeling, or decision process to identify an employee or employees that are most likely to have, or be associated with, a desired characteristic (e.g., a desired knowledge base, participation in certain aspects of an organization, familiarity with a specific event or fact, etc.); and Using the outcome of the data analysis, modeling, or decision process (and if desired, by comparing a model of the actual or inferred interactions and/or information flow within an organization to an existing, assumed, or proposed organizational model (such as one based on role, reporting structure, seniority, etc.)), identifying one or more indicators of suggested organizational actions or potential concerns, such as:

resignation of a key employee;

an increased employee churn rate;

a possible reason for a lack of operational effectiveness or efficiency;

factors associated with a successful task or project completion;

indicators of under recognized influencers within the organization;

an employee most likely to have specific information or an understanding of a task or project (which may be valuable in the situation in which the primary contact for that information or task is not available);

potentially more effective communication channels within the organization; or training or development opportunities for employees that the organization may wish to encourage.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to exchange communications or information, and/or provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, communications systems and applications, or other configurable components that may be used by multiple users for data entry, data processing, application execution, data review, etc. Although further examples below may reference the example computing environment depicted in FIGS. 1-3, it will be apparent to one of skill in the art that the examples may be adapted for alternate computing devices, systems, apparatuses, processes, and environments.

Note that an embodiment of the inventive methods may be implemented in the form of an application, a sub-routine that is part of a larger application, a "plug-in", an extension to the functionality or operations of a data processing system or platform, or any other suitable form. The system or platform in which the application, sub-routine, plug-in, or extension is implemented/embedded may be an email system, document processing system, single or multi-tenant business data processing platform, communication network, organizational record keeping system, etc.

FIG. 5 is a conventional organization chart based on role or reporting hierarchy. This represents the information that is typically available to an organization using conventional approaches. It is useful for determining the reporting structure (who reports to who), but not much more. Note that such a structure defines a static view of an organization, and not one that reflects the actual flow of interactions and information within the organization, which are dynamic and variable (where those factors are expected to be at least as important, if not more so, than the more formal lines of the illustrated reporting structure). Note that the conventional chart may indicate multiple levels of a reporting structure (as suggested by 502, 504, and 506 in the figure), and may also suggest certain groups within the overall structure (such as departments or projects, as suggested by 508, 510, 512 and 514 in the figure).

As will be described in greater detail, using an embodiment of the inventive system and methods may involve one or more of:
  identifying relevant sources and accessing data;
  creating (if necessary) a data structure for use in analyzing the data (such as a database, data tables, data matrix, etc.);
  analyzing, modeling, or evaluating the data in the data structure(s); and
  generating a representation of the outcome of the analyzing, modeling, or evaluating processes. In some use cases, such a representation may take the form of a hierarchical organizational chart on which is overlaid an indicator of a measure or metric corresponding to some characteristic of the relationship between persons or departments shown on the chart.

Figure 6A:
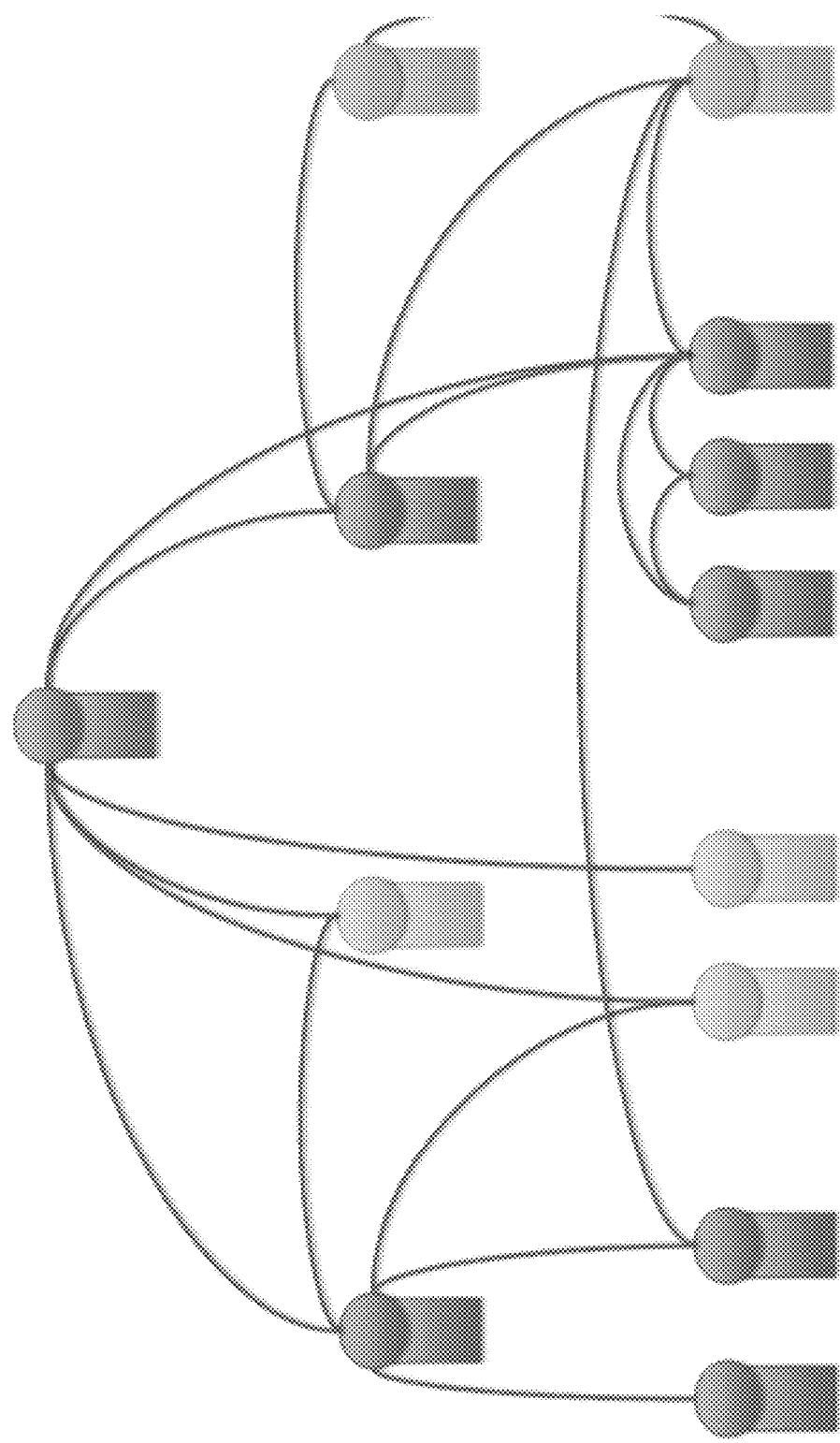
FIG. 6(a) through FIG. 6(i) are diagrams illustrating forms of organizational charts or visualizations that may be generated by an embodiment of the inventive system and methods, and then used in making decisions or evaluating the operation of an organization.
Figure 6B:
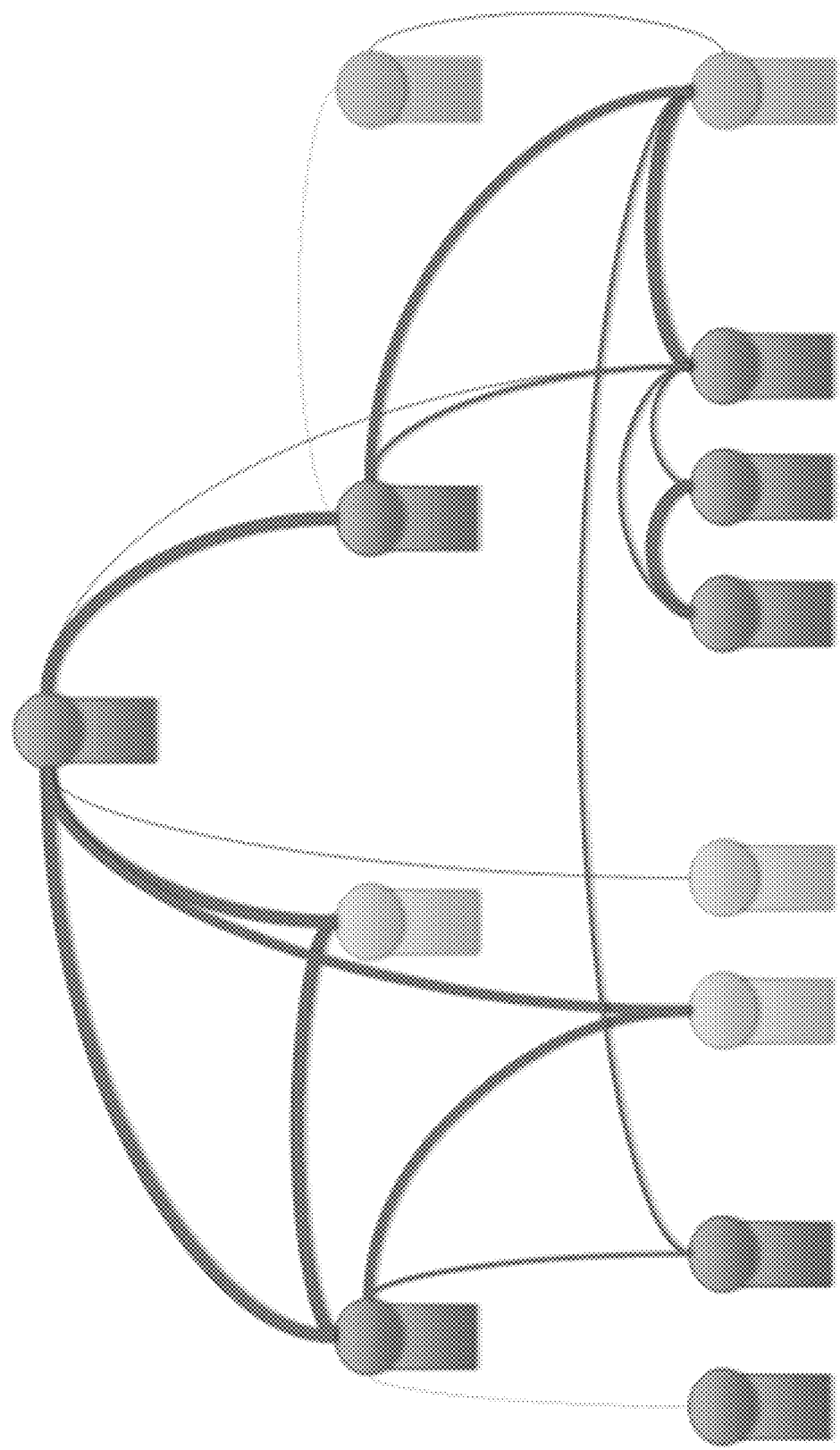

FIGS. 6(a) and 6(b) are example forms of organizational charts that may be generated by an embodiment of the inventive system and methods, and then used to assist in making decisions. FIG. 6(a) has had the additional interaction data overlaid on the traditional organizational chart. Information about how the members of the organization interact on a daily basis can now be quickly ascertained and acted upon. The layout of FIG. 6(b) has been constructed to emphasize the degree, number or significance of interactions between individuals or groups. This is suggested by the thickness or strength of a connection between two nodes in the figure. In some representations, this type of figure may be optimized to show shorter distances between heavily interacting members. This embodiment/layout of the chart may be used to identify and emphasize the team structure and suggest the most involved members or participants.

Figure 4:
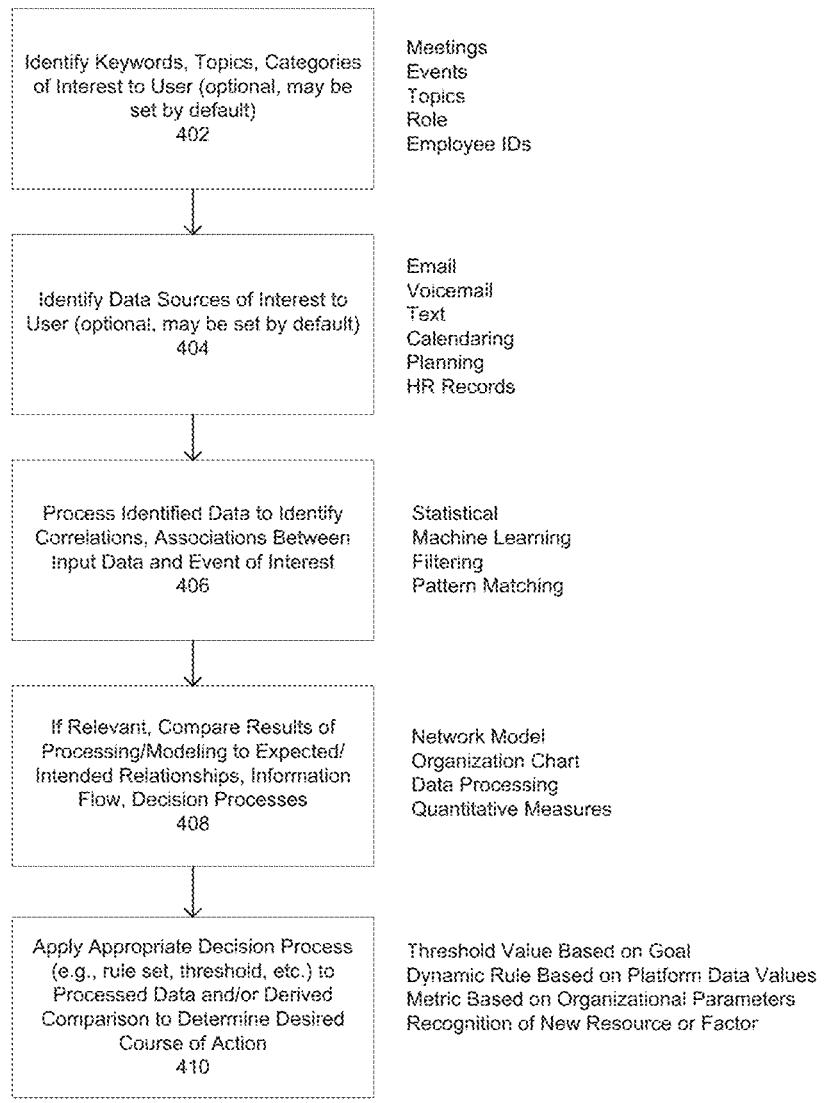
FIG. 4 is a flow chart or flow diagram illustrating a process, method, operation, or function for processing information regarding relationships and interactions, and that may be used when implementing an embodiment of the invention.

FIG. 4 is a flow chart or flow diagram illustrating a process, method, operation, or function 400 for processing information regarding relationships and interactions, and that may be used when implementing an embodiment of the invention. As shown in the figure, a user may identify keywords, topics, categories, specific events, date ranges, employee IDs, etc, that are of interest (as suggested by step or stage 402). These may be used by the system to narrow down the set of all communications/interaction data to those items that are expected to be most relevant to identifying/determining the information flow of interest. In some cases, these keywords, etc. may be set by a default process, in others a user may be presented with an interface that may be used to specify the terms of interest. Next (or instead, and optionally previously to the earlier step), the user or system (by default) may specify the potential sources of data or information of interest. These may include email, text messages, phone calls, meeting invitations, calendaring related data, HR records, etc. (as suggested by step or stage 404).

The identified/filtered data may then be processed to determine one or more of correlations, associations, or other relationships between the data input to a model or process (such as employees and the related interaction data) and an event or goal of interest (such as a decision being made, a policy being implemented, etc.). This may include one or more of statistical, machine learning (supervised or unsupervised), rule-based, or other suitable modeling and data mining methods, as suggested by step or stage 406. If applicable to the situation being examined, the results of the processing or modeling may be compared to the expected or intended relationships and/or data flow within an organization, as suggested by step or stage 408. This may be done with the aid of a constructed visualization (network model, org chart, "tree" model, etc.) of the organization, as modified by one or more filters or weighting mechanisms. Such a comparison/display may provide insight into the flow of information; the flow of information over time, the development of consensus, the implementation of a policy, the formation of a decision, etc.

An appropriate and relevant decision process may then be applied to the processed data in order to determine a recommended course of action, as suggested by step or stage 410. This may include application of one or more of a threshold value, a set of rules that include parameters based on platform data values (such as ERP, CRM, eCommerce, financials, etc. that characterize an operational state of a business, where that state impacts the decision that is desired to be made), a derived organizational metric, or other relevant factor or parameter. The recommended course of action may include use of a newly identified resource, a modification to a previous plan for achieving a goal, an improved plan for implementing a policy, etc.

Note that some of the methods described herein can be performed separate from and without the generation of an interaction based org chart, by using interaction data to develop interaction profiles, and providing these inputs to the appropriate algorithms, heuristics, or rules, along with other information or performance based factors. However, the interaction based org chart provides a useful visualization tool. The chart is generated (at least in part) from the accessed and processed interaction data, and can be filtered/modified by interaction details such as dates, topics, roles, or interaction types. The various charts can provide additional insight by being overlaid on the existing hierarchical structure, where some of these insights may not be readily apparent from the analysis alone.

For example, in succession analysis, an employee may be identified as a possible successor because they have a similar number of communications with the same types of groups as the position in question. However, a quick glance at the interaction weighted org chart might show that while the employee is apparently qualified for one position, they are either far too junior or too far removed from the department they are being considered for to be effective in the role. This information would be available without the chart with further data analysis, but it's easier to detect given the interaction org chart.

Similarly, in some situations it may be desired to identify the "next best source" for certain information; this may arise in a situation where the "best source" is no longer available (as might be the case if a task leader or manager were to discontinue their employment, be on travel, be ill, or otherwise be unavailable). In this situation, an embodiment of the inventive system and methods may be used to identify the next best source of that information based on determining an overlap between the meetings, interactions, or descriptive terms appearing in communications involving the two employees. For example, if both the expected best source and another employee were typically involved in the same meetings, discussions with executives, project reviews, etc., then the other employee would be a logical person to approach for information if the best source was not available.

The multiple types of interaction data may be accessed and processed (using suitable filters, decision processes, thresholds, criteria, rules, etc.) and provided as inputs to one or more analytical processes that can evaluate the data and produce a model of the interactions and relationships that the data represents. These analytical processes may include machine learning techniques, collaborative or other types of filtering, neural networks, network modeling, optimization, pattern recognition, statistical modeling, etc.

The output(s) of the analytical processes may be used to assist in making decisions regarding an organization and its employees. In some cases, this may be done by representing the output model in the form of a network diagram (employees/nodes and connecting lines representing relationships, a specific metric, known communications, etc.) or converting it into that form. The desired decision may then be made by evaluating the outputs with respect to and/or comparing the network diagram derived from the current/operative state of the organization to an existing or expected representation of the organization. This may be done to determine differences, unexpected relationships, data or information flows, etc. that may be suggestive of an improved way to operate some aspect of the organization.

Implementation of an Embodiment of the Inventive System and Methods

As described, a general implementation of an embodiment of the inventive system and methods may include components, elements, and processes that operate to provide one or more of:

A data acquisition, processing, and storage sub-system configured for use in acquiring and processing interaction and participant information for an organization;

A process or method for generating a visualization/representation of an organization's information and process flows based-on/weighted-by one or more characteristics of the interactions;

A process or method for implementing a data analysis process on the interaction and participant information, and for assisting in making decisions relevant to an organization based on that data analysis; and A process to compare a conventional or current organizational chart or arrangement (such as one based on role or reporting structure) with the visualization/representation of an organization's information and process flows based-on/weighted-by interactions (as appropriately filtered or analyzed). This may be used to identify differences (qualitative and/or quantitative) between the expected flow of information, interactions, or decision making responsibility within the organization and the actual or effective flow. This may be of help in identifying more efficient or practical ways of making certain decisions or communicating certain types of information. It may also suggest employees or roles within the organization that are less effective than expected, employees that are not as well suited to a certain role, employees that collaborate well, how a particular policy or concept is developed and implemented, etc.

Data Acquisition, Processing, and Storage Sub-Systems

In an example embodiment, the following inputs may be gathered by the system to track interactions:

Member/Employee Information (these can be tracked for each person in an organization).

Name of user/participant and details that include personal identifiable information, organizational classifications, and other measurable factors, such as;

Age, gender, education, race, address. This information can be used in interaction analysis to find patterns in participation and communication, which can then be used to identify and suggest opportunities for improving organizational inclusion and diversity;

Manager, Department, group, team, location, subsidiary, hierarchy level. These classifications are traditionally used to create hierarchy or function-based organizational charts; analyzing interactions in the context of these classifications is used to determine an individual's influence inside or outside their immediate group or reporting chain;

Employee skills, competencies and other qualifications, job title, job description, job requirements, job history within the organization;

Salary, tenure, last promotion date, employee satisfaction rating, performance metrics, attendance/vacation/PTO taken, productivity metrics (e.g., sales numbers, issues fixed, cases completed), etc. These factors included with an interaction analysis can be used for:

Measurement of employee engagement and a related calculation of employee churn risk that can be used to recommend retention and hiring practices; and Finding patterns between interaction behavior and performance/productivity used to recommend employee or group development, promotions, etc.

Interaction Data—Each instance of an interaction between employees/personnel is captured/recorded.

Interactions instances are related to a user/participant and may include one or more of the following information/details:

Member participating in interaction;

Additional members—this provides the list of other participants in the interaction;

Interaction Type. This can be email/message, event, recognition, record notes, version control, communications/mentions in other systems, chat rooms, etc;

Weight based on interaction type. The importance of each interaction is different so each type has an associated weight to give it more or less influence during the analysis. Weights can be adjusted manually or dynamically via a machine learning process that optimizes for a certain outcome or goal;

Participation level may be tracked when possible. This may be determined based on measureable factors, such as whether an event was accepted/attended/declined, or active correspondence in an email thread (versus just being on recipient list). During analysis, more weight may be given to interactions with a higher participation level, or certain interactions can be excluded from analysis based on low participation level;

Time & Date of interaction to monitor interactions over time, and if desired, give more weight to recent interactions, to filter interactions to use in analysis based on when they occurred; and Topic/Context—This can be an event name, note title, email subject, or process name, and possibly related records (if this interaction is tied to a customer record, transaction, issue, etc.). Tracking Context/Topic and Related record detail allows the system to apply filters to interactions based on organizational structures, which can be used to visualize information and process flows.

The accessed data may be used as an input or inputs to one or more data analysis methods or techniques. As noted, these methods or techniques may include one or more of statistical analysis, machine learning, pattern recognition or matching, application of criteria or rules, filtering, etc. The outputs of the data analysis or modeling may be used to construct a representation of the organizational structure in terms of its interactions, information flow, and relationships. The outputs of the data analysis or modeling may also (or instead) be used as raw data for a decision process (based on the relationships, correlations, and associations found as a result of the data analysis, some of which might not otherwise be evident).

In some cases, the data used as an input to either the analysis and/or decision process may include data values associated with a specific account maintained on a multi-tenant platform or dedicated business data processing system, such as real-time values of sales, sales velocity, revenue, profit, employee count, transactions processed, etc. This permits the interaction weighting, decision process, or other aspect of the data analysis to be a dynamic value that may change depending upon the operational state of a business.

Generating a Visualization/Representation of an Organization's Information and Process Flow Based on Interactions and Interaction-Related Information Traditional visualizations of organizational structures are usually based on the management or reporting hierarchy, where nodes are connected by reporting lines to create a tree-like representation of the organization, with the nodes at one level being placed into a lower or higher hierarchy than the nodes at an adjacent level (as illustrated by the example shown in FIG. 5). In contrast, using the interaction data accessed and processed by the inventive system, a non-directional linked graph data structure can be generated to provide a novel and informative representation of organizational structures and the internal and external information/process flows.

In one embodiment, this may involve calculating Member-to-Member Interaction Influence Factors (IIF) and using them to construct representative "Lines of Influence" between members of the organization. The IIF values may be dynamically determined based on interactions, such as the ones mentioned above (shared meetings, email correspondence, formal recognition, mentions in version control, chat room mentions, etc.). In some embodiments, this data is then considered with the existing static information about the reporting hierarchy.

As noted, in some embodiments, the structure/visualization may include further information based on one or more of the quantity, type, participation level or date of interactions between members (or other indicia or metrics that may be derived from the available interaction data). Further, different types of interactions may be weighted differently, thereby giving more significance or assumed influence to a shared meeting as opposed to a chat room mention, for example. Additional weight can be given based on the level of participation in each interaction, if that information is known. When given a particular date range for interaction analysis, additional weight can be assigned to more recent interactions, or those associated with the implementation of a particular policy, etc.

The following approach can be used to calculate a Member-to-Member Interaction Influence Factor (IIF):

The IIF is the sum of all weights for a set of interactions between one member and another, as defined by the equation:

$$IIF = \Sigma_i (T_i + P_i) * (D_i)$$

$T_i$—Weight from Interaction Type $P_i$—(Optional) Weight from Participation Level $D_i$—(Optional) Adjustment for date of interaction to give more weight to more recent interactions. A possible date adjustment factor is:

$$D_i = \frac{\text{(date of interaction} - \text{start date of range)}}{\text{total \# of days in range}}$$

In its simplest form, using only $T_i=1$ for all interactions, ignoring weight from participation and date adjustment, the IIF is a count of all interactions between two members;

Note that the IIF between two members (i.e., IIF from member A to B, versus IIF from member B to A) may be different due to the participation level; for example, if sending an email has more weight than receiving an email, or if assigning a task gives more weight to the assignor than the assignee. An overall direction of influence between two members can be established by comparing their relative factors. Identifying employees with net outward influence could be used to determine candidates for promotion, management, or as champions for ideas and projects; and The suggested formula may be modified to include additional weights based on a hierarchy level or other attributes that relate one person to another within the organization (tenure, scope of management responsibilities, etc.).

The categories of interactions to be considered and the type and participation weightings may be input to the system and adjusted, allowing an organization administrator to tailor the algorithm to best match the workflow. For example, meetings and events may be weighted higher than emails, if its determined meetings are more formal interactions deserving of more weight. If analyzing interactions to evaluate employee retention and attrition, more weight may be given to recognitions (in a recognition platform) than to other communications such as email; another embodiment may include the introduction of a value or values for the weights and/or network nodes based on certain of the underlying business related data. Further, the setting of the weights or nodes may act as a form of adaptive feedback control to cause the results to converge on a known desired result.

The influence strength between two members is derived in a similar manner, thereby producing a weighted mesh of interactions between all organization members. Influence strength may be a measure of the total amount of interaction between any pair of nodes, or the magnitude of influence between two nodes. The influence strength of each pair can be compared to find pairs with stronger or weaker links. Note that in some embodiments, a more insightful/useful organizational chart can be constructed by optimizing the layout of the organization to cause the strongest lines of influence to be the shortest lines on the new layout.

A possible visualization of an interaction weighted Org Chart might involve members/nodes being arranged in a two or three-dimensional space. Graph optimization algorithms may be used to minimize the value of the sum of the weight multiplied by the length of all interaction lines, while maintaining non-collision (overlaps) between the individuals displayed the graph. The resulting layout/visualization is an org-chart that better represents how the organization actually operates/functions. Members who interact a relatively large amount will be placed closer together than those that do not. Teams that interact regularly will naturally cluster together, forming groups that represent the actual interaction and information patterns within the organization. In addition, since the interaction-weighted org-chart is generated and updated automatically from real-time data, it can be assumed to be up-to-date and reflect presently existing or current relationships, patterns of communication, etc.

The data/information presented by the interaction-weighted chart is potentially valuable when evaluating operations decisions, such as the seating plans for an office, or understanding how to most effectively split or merge teams while maintaining efficient operations. When filtering interactions based on specific topics is applied, optimum choices can be made on decisions such as forming working groups, or identifying who is best to participate in an interview for a given position. For example, when mobile phones and applications were just becoming popular, most organizations would not have had a team specifically focused in this area. However as the market grows, it becomes necessary to form this team. If an organization wanted to form a team to focus specifically on mobile development, interaction analysis can be used and by applying a filter for "mobile" or "iPhone" or "android", an embodiment of the inventive methods would be able to identify individuals involved in relevant interactions and conversations for this area of development. These members can then be reviewed as candidates for a new working group in this area.

When considering a particular member/employee rather than the organization as a whole, the visualization can provide information useful to evaluating a member's performance, or to helping their manager understand their strengths and weakness as they interact with the team. A graph showing in what ways and how much a member interacted with other teammates, including whether the interactions appeared positive or negative, would help a manager anticipate problems, or capitalize on strong sources of decision making or collaboration. Note that although some of these insights into team dynamics may be possible to achieve in the absence of the inventive system, conventional approaches require significantly more effort from managers to collect and process data, and are much more susceptible to the manager's own personal biases.

Note that graph optimization algorithms may be used to minimize an overall metric (such as "value", "cost", weighted distance, etc.) of the graph based on the value of the sum of the weight multiplied by the length of all interaction lines, while maintaining non-collision between the individuals on the graph. See, for example, FIG. 6(a) which illustrates interactions between employees/nodes and FIG. 6(b) which illustrates a modification of FIG. 6(a) that emphasizes the relative amount of interactions between different nodes. As mentioned, the length of a connection between two employees may be shortened (suggesting a greater closeness and amount of interactions) to indicate a greater number and/or significance of interactions between two employees.

One or more of the visualizations (such as FIG. 6(a) or 6(b)) may be rendered as a hub-spoke model, where the employee at the hub is the employee of current focus and the thickness of spokes represented the amount of influence/interaction with other employees along the circumference. A larger circumference suggests that the employee of focus is a bigger influencer on other members of the organization. This may be of value because in some cases, it may be helpful to know the most effective influencers on a project team or in a group in order to conduct a meeting or engage in communications with the right person or set of people.

This information can also help in determining the advancement/promotion opportunities for the employee at the hub.

Note that there are a number of layout options or factors that can be emphasized, and that are available to a user when viewing an interaction based organization chart that is generated by an embodiment of the inventive system and methods. As examples, these options may include:

Show reporting lines: The traditional lines of the reporting structure are added to the graph (this would be an overlay of FIG. 5 on another representation, with the lines of FIG. 5 perhaps displayed in a different color, etc.);

Show influences: The various Lines of Influence are shown on the graph, color-coded by type (e.g., mode of communication), allowing for analysis of how the organization communicates;

Hierarchy-biased view: An algorithm arranges the organization members such that those higher up in the organization structure appear higher in the chart, thereby maintaining the 'top-down' view of the organization;

User-focused view: A specific member/employee is defined as central to the chart (typically the current user), and the organization is arranged around/below them, thereby more readily indicating key influencers for that member;

Influencer-weighted view: Members with heavier/thicker Lines of Influence, either with the user of focus (if available), or in the organization in total, would appear larger/bolder in the chart;

Minimum Threshold: Lines of Influence below a certain threshold may be discarded and not represented (i.e., they do not influence the illustration/layout), or are utilized but not shown in order to reduce clutter in the chart;

Topic Filtered View (Information Map): By including Topic/Context details when tracking interaction data, filters can be applied to the interaction based graph to show only lines that pertain to a particular topic or process. This creates an information map, which is useful in understanding how and where information about a particular topic moves within an organization. This type of filtered graph can be used for reference when making decisions related to the topic, such as for determining candidates for events, establishing committees, taskforces, stakeholders, and assigning work. For example, by adding a topic filter such as "Customer Support Escalation" to an interaction-based structure, the members with stronger lines of influence for that topic provide a recommended list for building a taskforce to address customer support issues as these members have a measured, quantitative experience with this topic. An example of this form of map or representation is shown in FIG. 6(g); and Topic Filtered View with Time/Date Details (a Process Flow Map): In addition to a topic filter, adding time/date details of interactions allows establishing the time-based order of interactions related to a certain topic. Starting with the interaction based chart as filtered for a certain topic, a time progression analysis can be applied to show how the interaction lines evolve over time, thereby producing an illustration of a time-evolving process flow. Note that the actual time-based evolution of a process may be different from the documented process flow—comparison between the two can provide suggestions for either improving the actual process or for modifying the documented process to make it more accurate. An example of this form of map or representation is shown in FIG. 6(i).

For example, in the example of applying a "Customer Support Escalation" topic filter to an interaction structure, time progression of the escalation process can be determined by using the time/date details of the interactions. Lines between members involved in the customer support escalation can evolve over time to visualize how the information moves through the organization. This can be used to identify and adjust for possible differences between actual escalation handling and the documented/intended process. This might permit identification of a particularly capable (or incapable) customer service employee, depending on whether their assistance was being sought (or was expected to be sought, but was not).

Process or Method for Implementing Data Analysis on the Interaction and Participant Information, and for Assisting in Making Decisions Based on that Data Analysis The inventive system and methods may be used to generate a representation, and in some cases a characterization, of the interactions between multiple employees/nodes in an organization. As part of generating this representation a method for calculating a metric, termed a "Member-to-Member Interaction Influence Factor (IIF)," was discussed. As recognized by the inventors, this metric/factor can be used in other types of interaction analysis and organizational decision-making processes.

In one embodiment, a "Member Interaction Profile" can be created for each employee/node/member, which includes their IIF metric(s) as determined based on each possible pairing with another member in the organization; this can be represented in the form of a multi-factor vector. A member's "Total Influence Factor" may be represented by the magnitude of this vector. The cosine similarity between two Interaction Profile vectors is a measure of the similarity of the interaction histories of any two members with regards to their interactions with other members of the organization (note that the process may subtract out the components representing interactions between the two members being compared). Note also that other forms of metrics may be suitable, depending upon the type of data and the use case (such as ranking by most frequent or common interactions, filtering or application of a threshold value, etc.).

Examples of interaction vector analysis and data processing that may provide benefits or advantages include the use of the inventive methods as part of the following applications or decision processes:

Succession Planning

When an employee vacates a position (e.g., due to termination, resignation, promotion, or reassignment), organizations often first look within their employee roster for a potential replacement. The current best-practice focuses on "qualification" as opposed to "fit for organization". This often results in decisions that are haphazard and error prone, as they are based on inadequate information and/or a subjective evaluation of the suitability for a person in a specific role;

This makes it extremely difficult to plan for successions or expansions, and leaves a company exposed to risk—reacting to vacancies results in gaps in the role (when an organization can't find someone soon enough) and/or people being promoted to a level or role that is beyond their ability to interact with the people required.

These problems can be exacerbated when the vacancy is in a leadership or managerial role;

Interaction Analysis for Succession Planning allows an organization to compare the interaction profiles of an employee (Employee A) in a particular position with the profile of another employee (Employee B). This produces a new dimension/metric with which to evaluate successors to a role if Employee A were to vacate their position, and can provide a higher degree of confidence in Employee B's likelihood of being successful in a role;

Note that because this does not rely on subjective measures, the analysis/evaluation can be performed continuously for multiple combinations of Employee A and Employee B. This allows an organization to proactively identify candidates for promotion, and proactively identify potential succession gaps;

Given two interaction Profiles (one for Employee A and one for Employee B, or for group A and Group B), the inventive methods can be used to calculate the distance between each profile, thereby generating an effective measure of the similarity in interactions between the two; and By performing a vector multiplication between this new vector of "similarities" and a separate weighting vector (which specifies how important each characteristic is), the inventive method can arrive at a single numeric value/metric representing an Interaction Network Fit for the network of employees in the organization (similar to the dot product of two vectors). This value provides a strong indication about how well Employee B fits into the network that Employee A operates in.

The methods can further augment the value of this data by comparing it to a company-wide baseline and a system-wide baseline (e.g., determining "how much of a fit is this employee compared to everyone else in the company?" based on one or more suitable metrics or areas of evaluation).

Individual Development Planning (Mentoring, Career Development)

Studying Interaction Profiles can provide recommendations when building an individual employee's development plan. Profiles can be compared to find differences in participation and communication between two people. Possible applications for this are:

Succession Planning: By comparing interaction profiles between one employee and their possible successors, the methods can identify gaps that the successors can work on. For example, Employee A has a strong interaction with Employee C. Employee B is a possible successor, but does not have a strong relationship with Employee C. It may be suggested that Employee B look for opportunities to interact more with Employee C if they are to be a better fit for the position of Employee A, particularly if it is felt that Employee A is an effective employee; and Performance Improvement Planning: Interaction profiles of high performers and low performers can be compared to identify possible gaps (this is possible because the system includes member details, such as performance ratings). For example, high performers in a Customer Support team may be found to have more interaction with the Sales team than low performers. As a result, in order to improve individual and team performance, planning for the low performers should include opportunities to interact more with the Sales team.

Reducing Churn Risk and Improving Hiring/Retention Practices

Churn Rate is the rate at which employees leave an organization, and the related Churn Risk is a measure of how likely it is for a particular employee to leave the organization. The current state of the art for calculating churn risk relies on a) employees answering questions like "how happy are you in your job" and b) managers estimating employee loyalty. This is inaccurate, subject to bias and attempts at "gaming" the system, and subject to frequent variation, as well as not being timely because such questions are asked infrequently (most organizations ask about these issues once per year; this inaccurate data is, on average, ~6 months out of date):

This use of the inventive methods solves the problem of predicting potential "churners" among employees and also provides a method to understand the main parameters causing employees to churn. This information gives an organization's leaders the ability to preemptively reach out to potential churners to try to retain them, or to preemptively focus hiring resources in an area with high predicted churn. In some embodiments, the inventive interaction analysis methods combined with machine learning algorithms/techniques may be used to generate these predictions;

There are multiple factors that can be analyzed in an effort to predict the likelihood of churn. One can look for common factors characterizing resignations at a company (both forced and those that might be undesired by an organization)—these may include patterns in vacation/PTO, relevant salary data (such as raises or a lack thereof), performance ratings, tenure, etc., where the presence of such factors are suggestive of a greater likelihood of churn. This is based on applying a machine learning technique to determine the relevant or most relevant factors that are present in someone who resigns;

Additionally, the inventive methods can examine the interaction profiles of employees who have left to see if there are common trends or correlations (e.g., if an employee Total Influence Factor goes down rapidly in a given time period before resigning). The method can look at the interaction factors in the context of the employee assignments, such as department, position, location, tasks, manager, etc. to determine a predicted risk of churn for a certain group; and A machine learning algorithm can be trained by looking at past churn behavior to "predict" the churn risk for the future, either for an individual employee or to calculate an aggregated churn risk for a group of employees. Individuals or groups with higher risk can be given more focus during salary reviews and a larger budget for retention, or these groups may have more hiring resources focused on them to fill the gaps in available roles, capabilities; etc.

Determining Influencers

Because the system tracks member information in addition to interaction details, an analysis of the Interaction Profile data can provide a way of viewing how a member operates as part of an organization. For example, such data can be processed to determine the amount of interaction that an employee/member has with other employees or groups, and can be evaluated by considering multiple dimensions or employee characteristics. This can generate a measure of how much interaction and influence an employee/member has inside/outside of their own team, department, location, or with members of similar or different salary ranges; ages, ethnicities, amounts of tenure, etc.

A Total Influence Factor was previously described as a sum of all interaction influence factors for an individual member. Additional influence factors can be calculated by summing over the influence factors for a particular set of criteria within an Interaction profile; examples of this are described below:

For example, a sum of the IIF value for all members in the same group as Employee A (based on one or more of department, salary range, age range, location, tenure, hierarchy level, etc.), provides a measure of Employee A's Internal Interaction Influence Factor. Similarly, summing over IIFs for all members outside of Employee A's group provides an External Interaction Influence Factor;

A Relative Influence Factor can be calculated by comparing Total, Internal or External IIFs across a team or organization. Each member can be associated with a score that represents how much influence they have in relation to other people on their team;

Team members with high relative internal or external influencer factors may be good potential assets for promotions or for including on certain projects, marketing pitches, etc. The higher influence factors may indicate the member's effectiveness, ability, and comfort in navigating the organization. As a result, because of the inventive interaction analysis, recommendations can be made for planning the development of a team or project; and In addition, predictions of a relatively high influencer can be tested over time. By comparing historical influence ratings vs career progression, patterns in influence and progression can be determined and used to identify high performers early on.

Organizational Development and Planning
Goal Planning:

Group leaders generally have defined goals for their group to accomplish, whether these come from higher up or are set by the leaders themselves. It's usually the leaders' responsibility to decide what actions need to occur to accomplish these goals and also who in the group will be assigned to specific tasks. Conventionally, a leader may attempt to guess at a best fit based on their knowledge and memories of previous related actions. However, the inventive interaction analysis can be used to help determine more reliable assignments, based on quantitative information about group members' historical activities:

If the goals fall under a certain topic/subject, then use interaction analysis to find members with multiple or more significant interactions in this area; and If the goals have defined participants (i.e., a project needs to involve both Sales and Support, or the VP of Operations), then use interaction analysis to find members having strong influence factors with regards to the other groups/participants.

Group Development:

In developing an organization, leaders need to manage successful individuals and groups, as well as those that need improvement. They may look at behaviors from a successful group and see how these can be applied to underperforming groups. Interaction activity analysis in the context of strong performance provides an additional metric that leaders can use to compare between groups and identify possible areas for improvement:

For example, Sales teams that have a lot of interaction with Support may out-perform other teams. This would suggest increased interaction between Sales and Support; and Business Analysts who have less interaction with Development may make better predictions (as measured by analyst performance). If this is found to be the case, then leaders may choose to encourage isolation between these groups during certain phases of product development or marketing.

Hiring/Promotion Practices:

Interaction analysis can be used to assist in making hiring or promotion decisions. Traditional factors for hiring/promoting may include performance, education, previous experience, and the hiring managers "feeling" about the candidate. Interaction activity is an additional factor to consider that can provide a measure of the amount and significance of an individual's previous interactions within the organization:

Interaction analysis may support or disprove claims of relevant experience. If the position requires working with a particular department, being a strong internal influencer, or communicating with exec-level management, a candidate's interaction profile can provide this information (and is independent of either the candidate or evaluators perception of their experience in this area). Interaction profiles across candidates can be evaluated for an unbiased comparison;

As mentioned previously in the context of succession planning, the inventive system can be used to compare a possible candidate's interaction profile to those of other members that have been successful in a role (as measured by performance ratings, time to promotion, salary raises, bonuses, etc.). Similar interaction profiles may indicate a greater likelihood of a candidate succeeding in a position or role, and similarities can be compared across candidates to find the best match; and For the purposes of hiring, interaction profiles can be created for external candidates. Data can be mined for candidates regarding events, publications, conference proceedings, recorded government sessions, discussions and mentions in external social networks and websites (such as GitHub, Facebook and LinkedIn).

Facilities and Location Planning:

When organizations plan for the use of their facilities, they may decide where different groups, departments, and individuals should be seated/located. This can be performed on a large scale, such as for determining cities/countries for offices and which departments will occupy those locations, or on a smaller scale, such as planning placement among office parks, buildings and floors. A conventional approach to facilities planning may cluster groups based on cost centers; for example, administrative functions like Legal, Finance and HR may be caused to occupy the same space:

Interaction analysis can provide insights and alternative suggestions for facilities organization and planning. Measuring the quantity of interactions between individuals and groups and comparing this across the organization indicates which parties communicate more often and participate in similar events. Instead of seating being based on functional groups, the inventive interaction analysis may recommend placing groups closer based on shared experiences. This could translate into an increase in productivity and savings for the organization, since it facilitates communication between members and groups that have a proven interest in interacting;

For example, instead of placing the administrative functions of Legal, Finance; and HR together based on a cost-center perspective, interaction analysis may show that the Legal department has more interactions with Sales & Marketing, or that HR has more interaction with IT. The inventive analysis can also be used to determine the seating arrangement for individual participants (e.g., for one particular lawyer it may be beneficial to sit near legal).

Figure 6C:
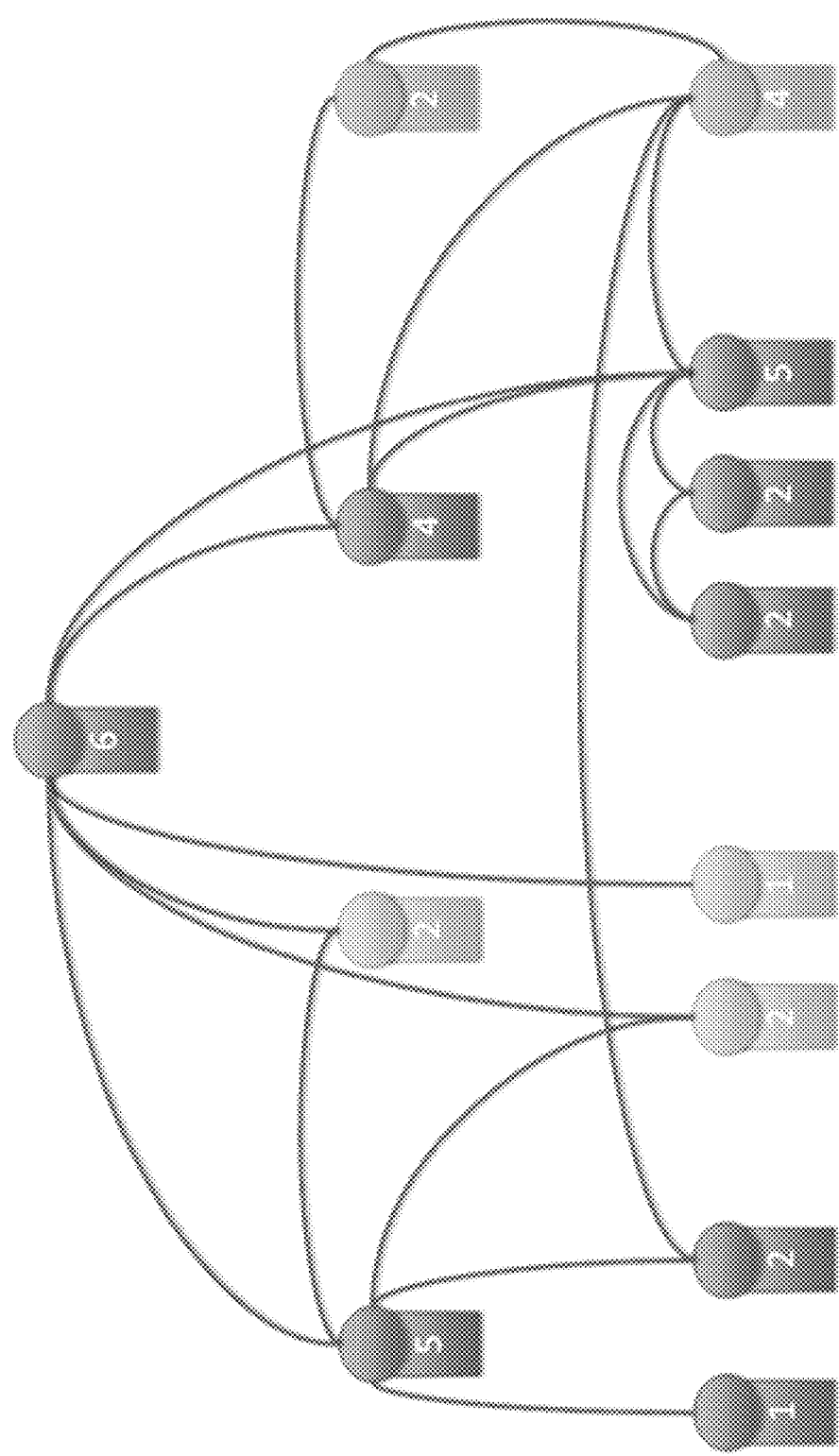
Figure 6D:
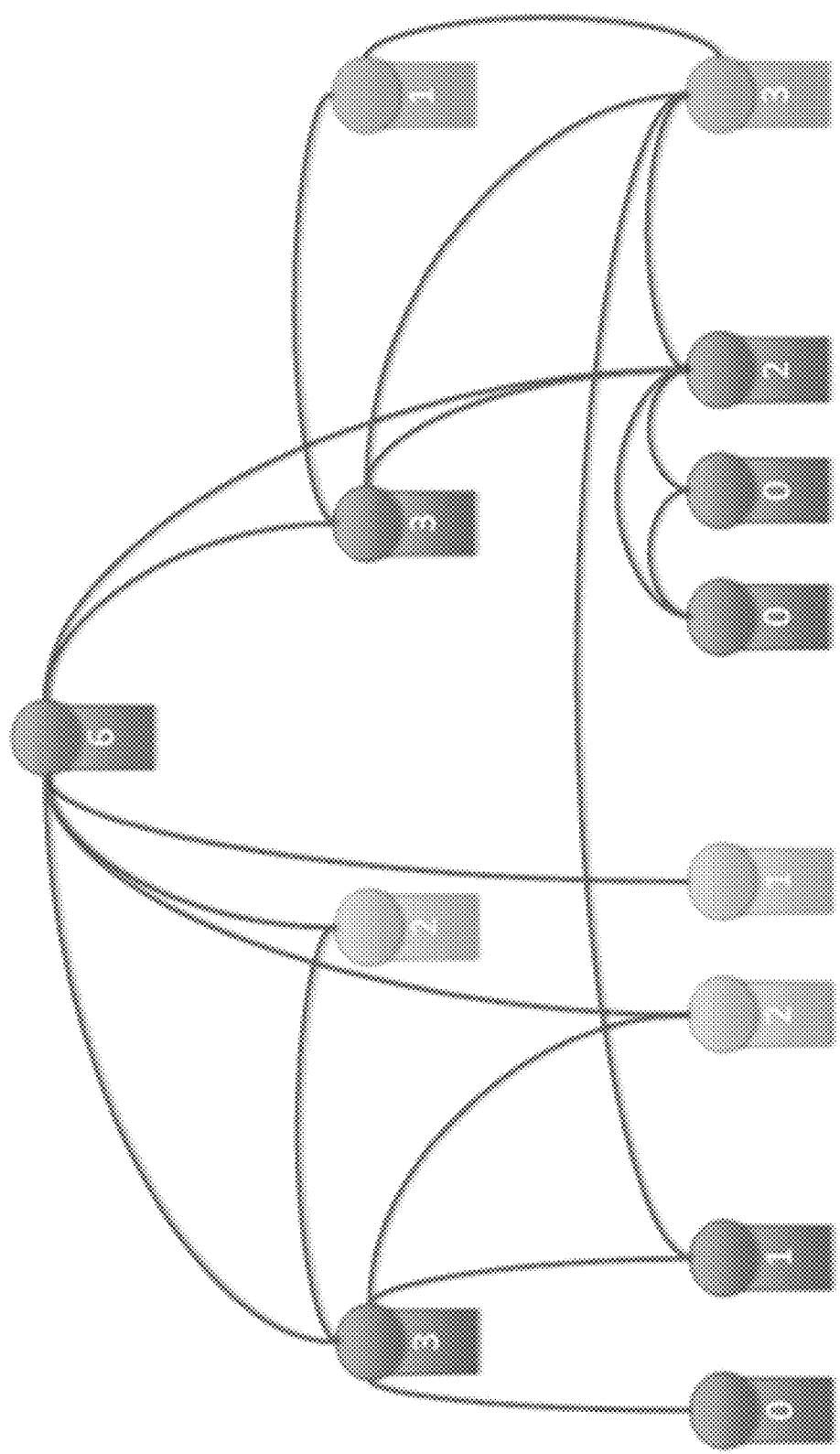
Figure 6E:
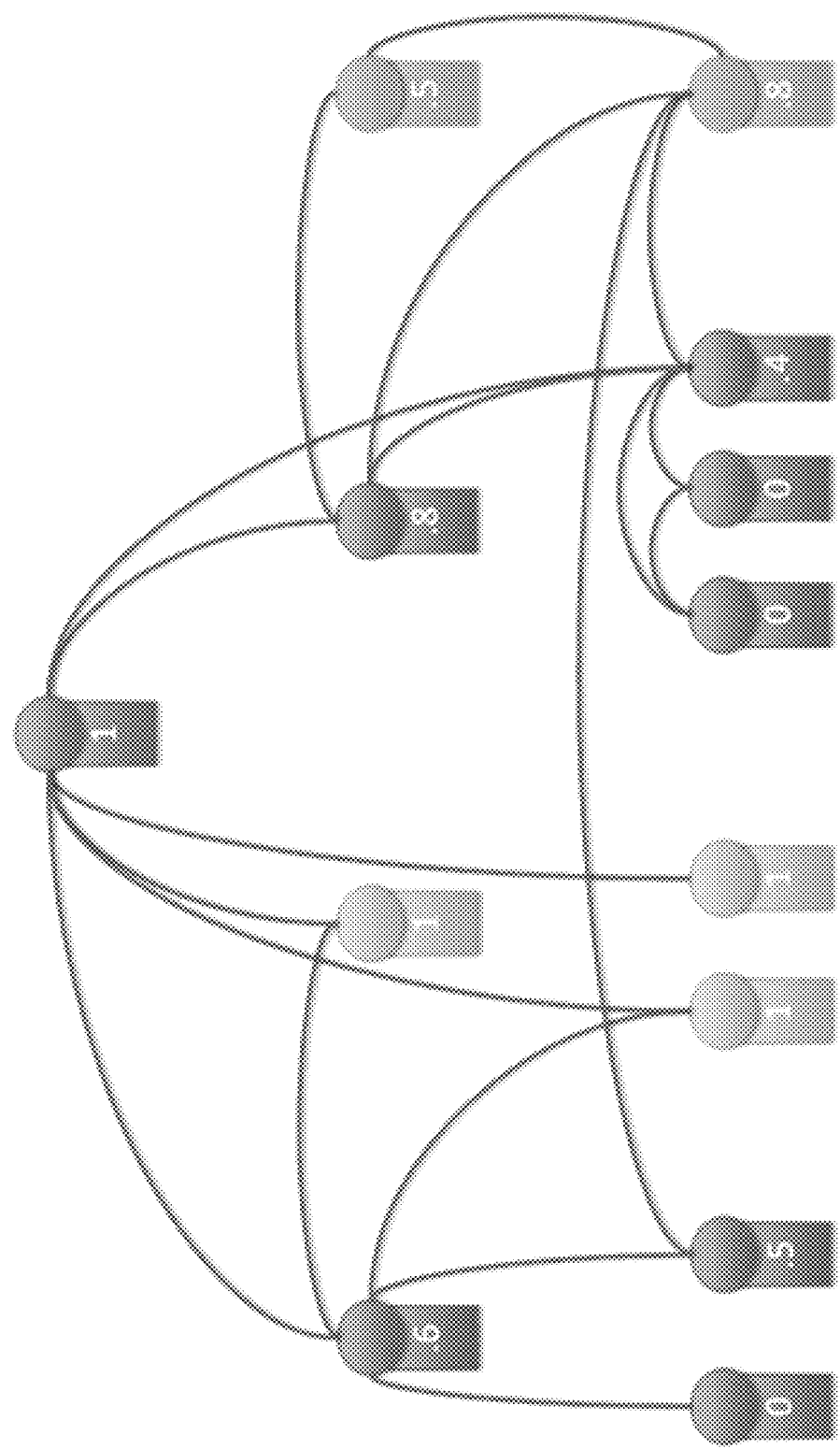
Figure 6F:
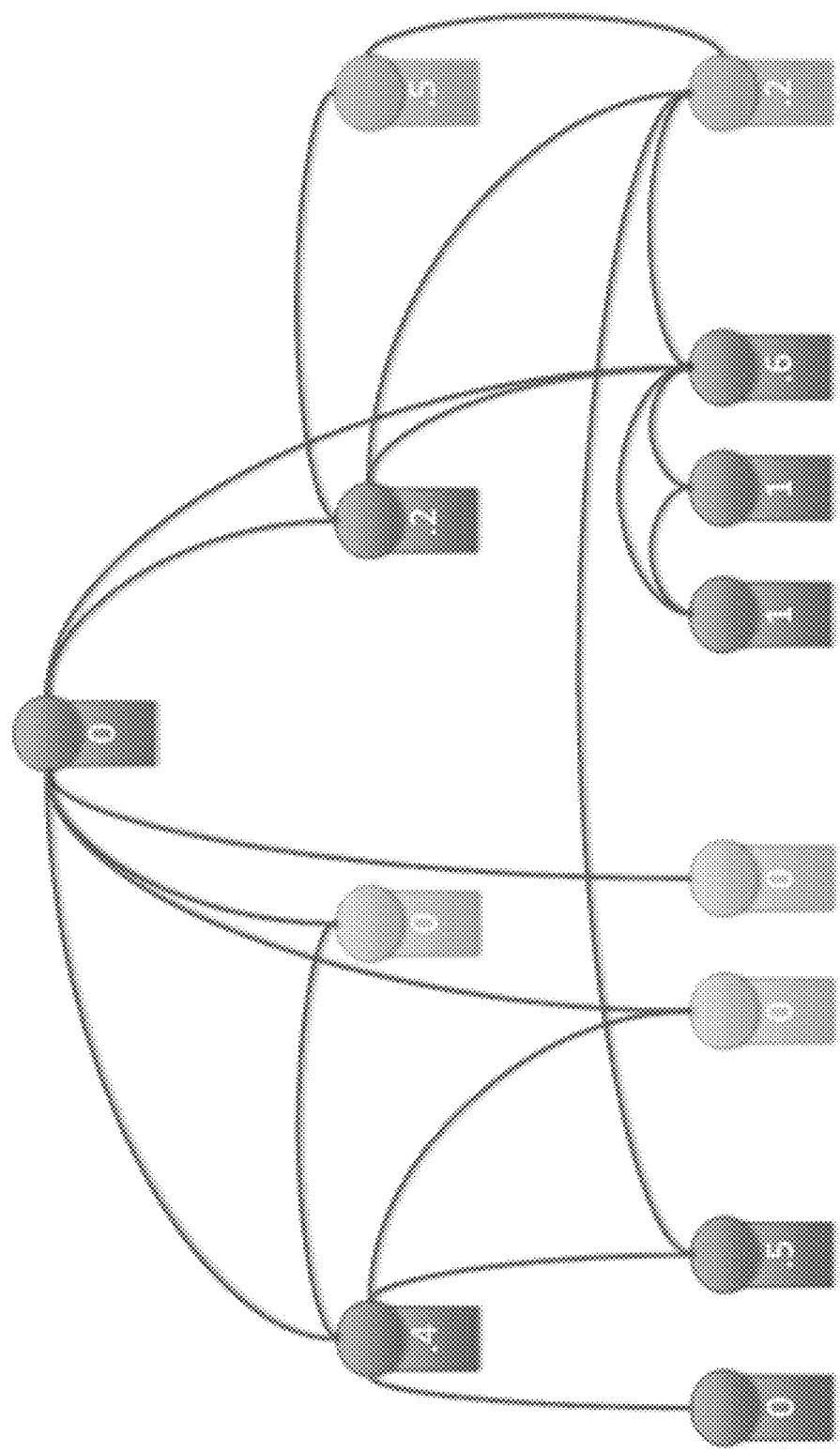
Figure 6G:
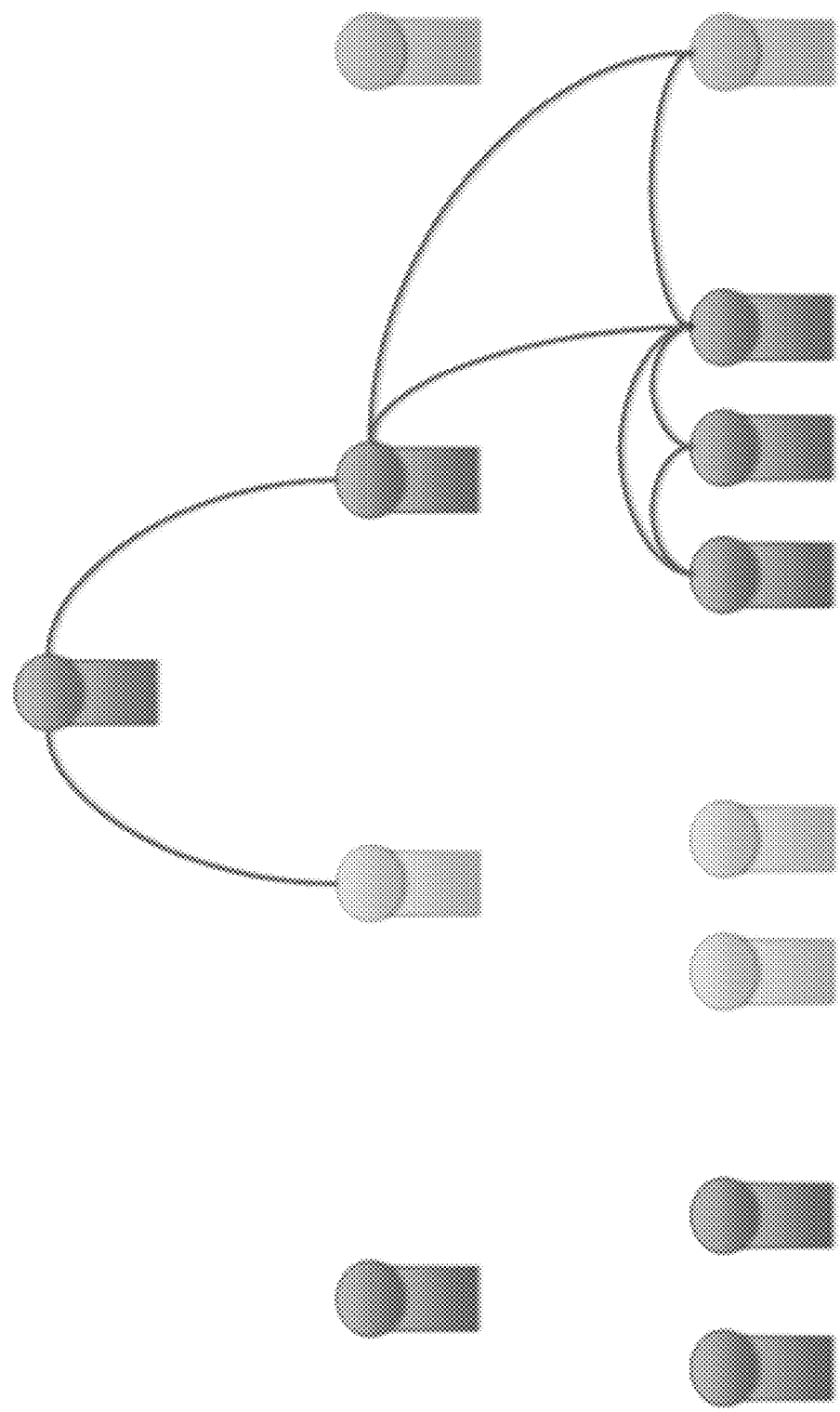
Figure 6H:
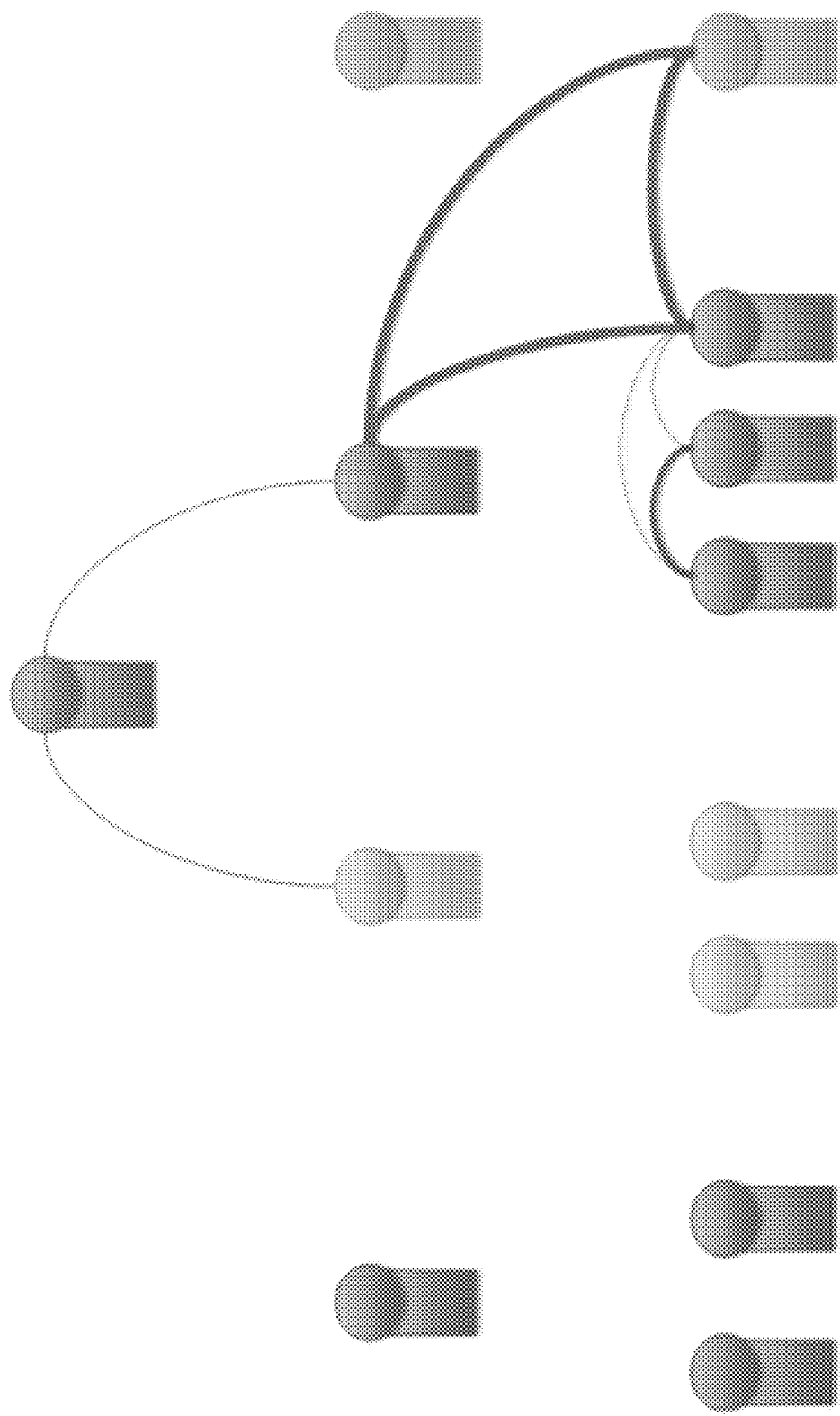
Figure 6I:
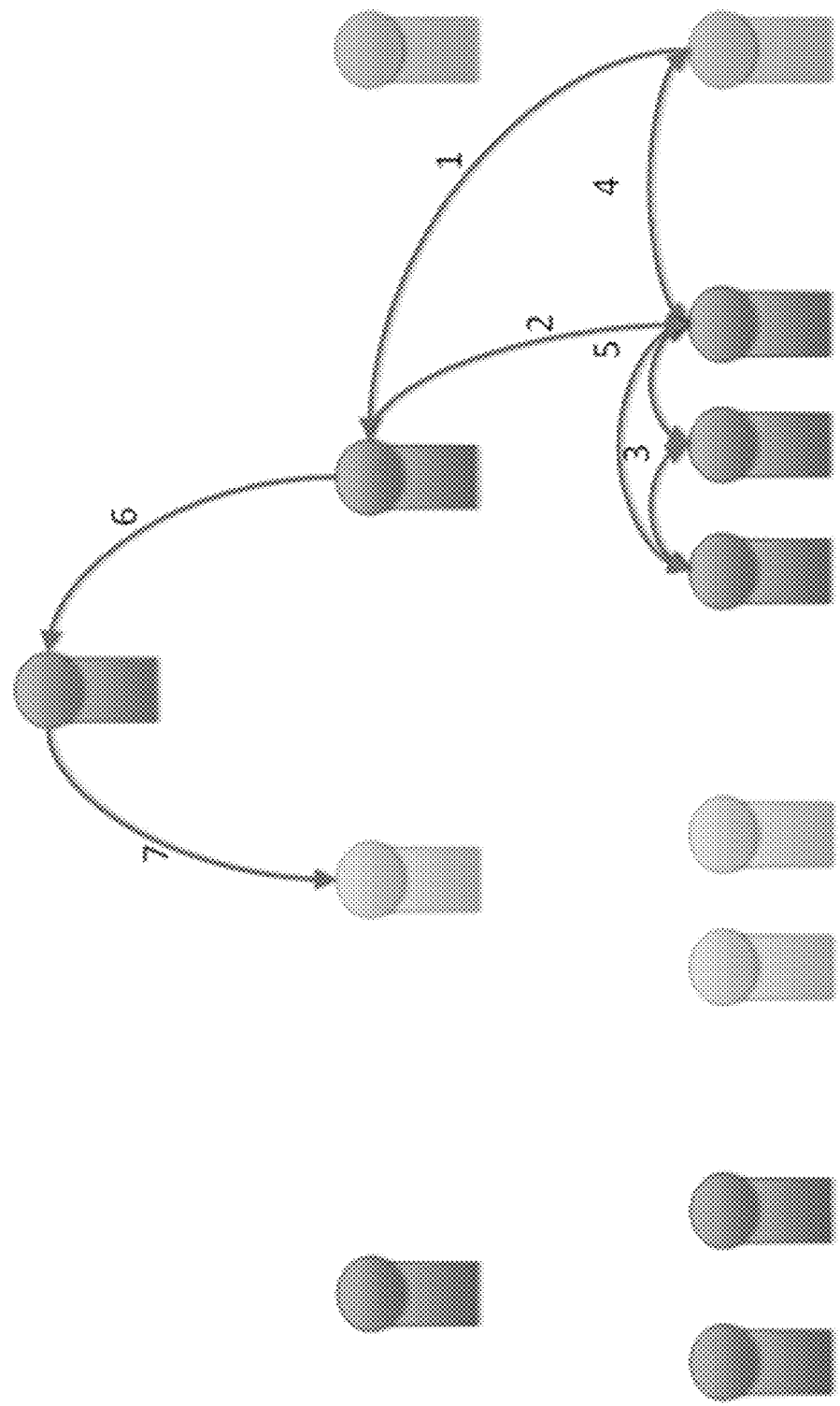

FIG. 6(a) through FIG. 6(i) are diagrams illustrating forms of organizational charts or visualizations that may be generated by an embodiment of the inventive system and methods; and then used in making decisions or evaluating the operation of an organization. Briefly (and as referred to previously); the diagrams may illustrate one or more of the following aspects of an organization's structure and communications or interactions flow:

FIG. 6(a)—an interaction based representation in which the lines or connections between employees/nodes represent a measure of the interactions between those two nodes— these interactions may be filtered/evaluated to indicate one or more other characteristics of the underlying interactions, such as number, relative importance, topic, timeliness, frequency, order of interactions, etc.;

FIG. 6(b)—in this representation, a thicker connecting line indicates a greater number of interactions;

FIG. 6(c)—in this representation, the number of interactions that a person/node participates in is indicated by a label associated with the icon for the person—note that based on application of the appropriate filters or thresholds, this may represent the total number of interactions the person engaged in with all others over a specific period of time; the total number related to a specific topic, the total number satisfying a specific rule or condition, etc. This number can be used as the basis for determining the person's relative total influence or another measure of the significance of their interactions;

FIG. 6(d)—in this representation, the number of interactions that a person/node participates in with persons outside of their primary group is indicated—this may be an indication of their relative involvement or influence external to their primary working group or team;

FIG. 6(e)—in this representation; the number of interactions that a person/node participates in with persons outside of their primary group relative to their total number of interactions is indicated;

FIG. 6(f)—in this representation, the number of interactions that a person/node participates in with persons inside of their primary group relative to their total number of interactions is indicated;

FIG. 6(g)—in this representation, only interactions that are related to or concern a specific topic (e.g., an upcoming event, operational issue, etc.) are illustrated;

FIG. 6(h)—in this representation, the interactions that are related to or concern a specific topic (e.g., an upcoming event, operational issue, etc.) as weighted by the number of such interactions are illustrated—this provides a graphic indication of where the communications related to the issue are most focused or concentrated and may suggest those having the most knowledge or information about the topic; and FIG. 6(i)—in this representation, the order of occurrence of the interactions is indicated by a numerical sequence— this provides insight into how the communications and interactions occurred over time and may suggest how best to investigate the cause of an issue, how the solution to an issue was developed, etc.

Note that although many of the organizational/interaction representations described herein are referred to as types of "tree structures", embodiments of the inventive system and methods are not limited to such representations. For example, other suitable forms of representations include, but are not limited to, non-directional graphs, treemaps, etc.

Further, although many of the organizational/interaction representations described herein may display connections or characteristics of connections using size and/or color, other indications of the relative strength or importance, or another characteristic of a connection or interaction path may be used. These include, but are not limited to, dots, dashes, animations, shading, etc.

Additional Description of Use Cases and Benefits of the Inventive System and Methods An embodiment of the inventive system and methods for generating an interaction weighted representation of an organization and interaction data processing may provide one or more of the following benefits/advantages:

Developing a more accurate understanding of an organizational structure based on interactions, including identifying more effective and efficient communications/influence paths within an organization (in terms of personnel and relationships between personnel);

Generating a model/map of the information flow within an organization, including the use of topic filters to permit tracing of communications or interactions regarding a specific topic or event. Using the developed interaction weighted organizational structure with the application of a suitable filter enables the identification of interaction-based lines of authority or influence for a particular topic or decision. Such a display indicates how information flows within an organization by topic, a person or group involved in a decision, an event attended by a person or group, or other relevant aspect of a decision or task. The filter or filters used may provide specific benefits, insights, uses, etc. Examples include:

Apply topic filters for a certain customer facing issue to identify the people involved in handling that issue; these people are the best candidates for a task force to address the underlying root of the issue; or Apply topic filters for a particular decision to see which types of interactions were most common while making the decision; combine with outside context of whether the decision making process was effective or not to identify an optimal way to communicate (e.g., phone calls are more effective than emails, or one call to this person should resolve this issue); and Mapping process flows, information distribution, or decision processes using appropriate filter(s) (e.g., process, topic, participants, keywords, etc.) and adding data regarding the time/date and/or length of an interaction to obtain insight into the development of a process flow, task, or decision process as a function of time through an organization. This may be used to identify "choke points" in a process, to identify those that influence a decision maker, to determine actual information flows and to modify them to be more effective, etc.

As noted, both the organizational representation and the data analysis techniques described herein are based on the tracking and analysis of interactions, combined with information about individuals and an organization; these provide insights into the operational (as opposed to the hierarchical or established) organizational structure in order to assist in making decisions related to organizational planning, resource allocation, and development.

Embodiments of the inventive interaction weighted organizational structure (and if desired, coupled with the use of one or more suitable filter mechanisms based on topic, person, keywords, time, etc.) may be used to provide insight into an organization's operations in one or more of the following ways:

- Comparing a traditional hierarchy based view of an organization with the Interaction Based Organizational Structure to determine how they vary and assist in the identification of outliers. While reporting lines move up or down a hierarchy, communications and information flow can occur in any direction (up, down, laterally) between individuals and across groups. Indications of strong interactions across parts of the hierarchy can suggest a beneficial matrix or dotted-line reporting path that would formalize and strengthen a working relationship, and one which has evolved naturally (such as ones based on common interests or a mentoring relationship);
- Investigate the relationships between certain interaction structures and the health and productivity of the organization, for purposes of organizational development and planning;
- Succession Planning—compare interactions of a current person in a specific position or relationship with others for purposes of suggesting a possible successor, based on identifying someone having "similar" or desirable interaction data (based on a suitable metric or comparison). Suggestions could be very specific to the person being succeeded (i.e., successors should have strong interactions with their possible future manager) or suggestions can be made for the type of role being filled (i.e., successors for an Audit position should have many interactions with IT and Finance);
- Assigning ownership of a business object, task, responsibility, event, business relationship, etc. by determining who has interacted for that purpose previously to suggest a participant based on common interaction profiles and historical actions;
- Assessing a measure of employee engagement from the type and frequency of interactions they have, and then using this to make decisions relating to reducing employee churn, increasing employee retention, selecting an employee to participate in a function, task, etc.;
- Calculating the churn risk or a related metric relating to the possibility of an employee voluntarily resigning, by combining interaction based employee engagement measurement(s) with salary, attendance, feedback information, etc. Historical employee data that includes interactions and employee specific information provides both cases of long tenured employees and cases of attrition for analysis. Machine learning algorithms can be trained using this data to identify and weight possible factors associated with employee churn events and then to "predict" possible cases that would benefit from further analysis or investigation;
- Developing an interaction profile for each employee that can be used to drive employee development or to decide how that employee is being used in the organization. Part of this aspect could be a "diversity" rating for each employee that measures the variety of people they interact with, based on classifications like age, race, gender, location, salary. This information can be used to identify opportunities for development for people or managers that need to interact with diverse groups. For example, identifying managers that interact more with reports of one gender instead of the other, and encouraging them to take a workshop on unconscious biases;
- Combining interaction-based analysis with employee performance, sales, and/or productivity data to provide guidance to employee management when particular interaction activities are shown to be correlated with desired types of performance. In some cases, machine learning techniques could be used to identify factors or combinations of behaviors/attributes that are most likely to indicate success (as measured by increased sales, etc.);
- Evaluating "Group Health" by comparing interaction metrics across individuals and teams to determine if there is a correlation between type/number of interactions and group performance/engagement/retention, and then use those results to steer development of a task, project management, group events, etc.;
- Analyze an individual's interactions within the context of the organizational hierarchy—is this person communicating up or down more often? Are they well placed in the organization as a potential leader, or other role;
- Develop a better understanding of Team/Department/Group dynamics—which individuals interact more in-group/out-of-group? How does this relate to effectiveness or the coordination between groups? This information can be used to identify internal vs. external influencers to enable such individuals to be used more effectively;
- Understanding the "actual" or effective company structure—which groups interact the most with each other or with management? This may be used to determine a more effective company structure, layout, seating arrangements; and
- By applying this form of analysis over multiple organizations, the interaction-based organizational structure may be related to long-term financial performance to identify "profitable" structures and/or behaviors. Interaction analysis in one organization might find that improved communication between Support & Sales leads to higher retention and renewal rates. Comparing this across multiple organizations may provide evidence that such interactions and the policies or structures that facilitate them are "profitable" (similarly, it may find no evidence of a strong correlation between those interactions and success in other organizations).

As another example of a use of the inventive system and methods, if a machine learning algorithm is used for the prediction of a potential employee-churner, then the algorithm could provide the probability of churn for each specific employee and a set of parameters values which contribute most to a relatively high probability of churn. Using this information, an organization could preemptively make efforts to retain certain employees;

- For example, using this type of algorithm, it might be estimated that employees who: a) did not take a vacation for at least 2 weeks during the last year; and b) did not have a raise in salary for at least 2 years in row are likely to churn during next quarter with a probability of 30%, while on average the employee churn rate is 2% per quarter;
- This would mean that an employee who satisfies the conditions in a) and b) is much more likely to churn than the average employee. Taking this information into account, HR can preemptively contact those employees having the 30% probability of churn (or those felt to be most important), and either (i) request/ require them to take PTO within the next several months, and/or (ii) suggest to the executive management team that the company provide some type of salary raise (5%, raise for example) to those employees; and These kind of actions could reduce/prevent the churn of high performing employees (or otherwise valuable ones, such as those responsible for connecting with and interacting with important employees) in the near term. This would benefit the company by not only retaining those employees, but also reducing the costs and effort required for recruiting and training a new employee in that position.

As a further example, embodiments of the invention may be used to assist in optimizing the hiring process of a company/organization. In this use case, assume that an embodiment of the method predicts that employees who are (a) "software engineers", and (b) did not receive a salary raise 2 years in a row are likely to churn with a probability of 35% in the next quarter, while the average churn rate per quarter is 2%. This would mean that this group of employees is much more likely to churn than average. The HR department could receive this prediction in real-time, and alert the executive management team. The HR department may also provide a suggestion to provide a meaningful salary raise to that group of employees;

However, the company might not have enough financial resources at that time to provide a meaningful salary raise to the entire group of employees. Assume that the company has total of 100 employees that satisfy conditions (a) and (b) above. That would mean the model predicts that, on average, 35 of those employees would leave their current position within the next quarter. This could be a disaster for a company, if it were to happen by surprise and impacted an important product release or other deadline; and By being able to "predict" or anticipate this situation, it might allow HR to proactively/preemptively start a hiring/interviewing process for approximately 35 software engineers. In that case, when some software engineers did leave the company, HR would have new hires/substitutes in the pipeline and available sooner than if they had been caught unaware. Otherwise, the company could lose 35 software engineers fairly rapidly, and it might take much longer to hire the same number and quality of replacement employees.

Aspects of the inventive systems and methods relate to how various forms of interaction analysis may be used to assist in making business decisions. By tracking the interaction history and creating an interaction profile for each person, and then using other information that is available (e.g., sales, productivity, performance, classifications), the results can be used to more effectively and productively manage an individual. This type of analysis can also be used to develop aggregate metrics of interactions in order to assist in managing teams or groups. As noted, applications of these concepts include (but are not limited to):

Network Analysis for Succession Planning;
Calculating Risk of Voluntary Resignation;
Intelligent Selection of Activity Owners/Attendees; or
Identification of the most likely (or next best) source of information about a task, project, contract, etc.

Embodiments of the inventive system and methods can provide insights or information about an organization that could not/would not be able to be obtained otherwise. This is at least partly the result of utilizing a novel approach incorporating machine learning and specific attributes of employees, along with information regarding aspects of the employees' interactions, relationships, and communications. Further, implementing these inventions as part of a data processing platform that has access to ERP, CRM, eCommerce, HR, email, financial, or other types of data (whether for one or multiple tenants) may provide insights or a better decision process than conventional approaches.

Note that in some embodiments, benefits such as an improved understanding of the operation of an organization or an improved decision process are obtainable, at least in part, as an extension of the invention(s) (the interaction weighted display and interaction data analysis) because of the incorporation of the following elements or aspects:

1. The types of data available on a data processing platform (ERP, CRM, eCommerce, HR, financial);
2. The ability to access real-time values of platform data, so that interaction weights become a function of time, or other data used in making a decision becomes time-dependent;
3. Information regarding an interaction-based weighted measure of a metric or organizational characteristic (aside from simply as an indicator of interactions) may provide a fuller and more useful understanding of an organization. For example, an interaction-based weighting might be applied to a standard organizational metric (such as revenue, profit, head count, etc.) to provide new insights and value into the reasons for (and ways to improve) bottom line financial results; and
4. The use of real-time business data or metrics may enable a dynamic visualization or representation that indicates what business issues trigger communications, and hence may provide a way to "learn" (e.g., based on machine learning to determine which factors are strongly correlated with a certain type of interaction) what business data combinations may indicate a possible problem before that problem becomes noticed and acted upon.

In another use case, an embodiment of the invention may use "near real-time" metrics in order to trigger an alert that a specific employee might become a churner. For example, one important parameter could be the "number of times the person logs in to their LinkedIn web site account". From historical data, the model might observe that employees with a higher number of LinkedIn logins per month are more likely to leave the company. Excessive or out of the ordinary behavior in the regard could trigger a "near real time" alert to the HR department that the employee might be (or is more likely to be) a potential churner and the department could then decide whether any pro-active response was justified.

As described, embodiments of the inventive interaction-based display and/or the associated data analysis may be used to more efficiently and accurately determine the flow of information and decision making within an organization, and suggest areas of improvement. The results of evaluating and analyzing interaction data and/or the visual representation may be used to assist in making decisions for purposes of one or more of organizational planning, employee or project management, creating a more efficient flow of communications, task assignment, or employee development. As additional examples, the following describe possible situations in which valuable insight(s) can be obtained from use of the inventive system and methods:

Specific information obtained from the inventive interaction—weighted display and/or data analysis may be used to initiate specific organizational programs, tasks, or changes in staffing:

a relatively high frequency of interactions between two employees might suggest placing them together on a team or task, rearranging task assignments to better utilize their cooperation, or altering work locations to encourage (or prevent discouraging) interactions;

interactions suggesting a specific topic being discussed between two employees or groups of employees (e.g., senior management, entry level, administrative) more than in the past (or in an unexpected way) might indicate an area of concern that would benefit from increased attention, or that should be discussed with a wider audience;

interactions suggesting that a specific employee is more likely than would be expected to be communicating with a customer may suggest that the employee should be brought into more interactions with the customer;

interactions suggesting a lack of bi-directional flow of communications or interactions may suggest a management or morale issue that should be investigated or addressed; or Similarly, a lack of interactions or the expected degree of interactions may indicate a need to encourage cooperation in order to maintain operational efficiency;

In some cases, strong associations between specific values or trends in an organization's operational data (such as ERP, CRM, eCommerce, HR, financials) and other interaction-related events within the organization might suggest that the operational data values or trends serve as an important trigger of a certain type or flow of interaction:

This might enable use of modeling, machine learning, pattern matching, or other data analysis techniques to "predict" the need for a meeting, response from management, intervention by an IT department, press release, etc.; or This might enable a customer service representative to "get in front" of a problem that is likely to be faced by a customer and provide a solution in advance of being asked by the customer.

Gathering the data that may be used for the types of processing and analysis describe herein may be done in a variety of ways, depending to some extent on the data type, format and sources. Some organizations use ERP, CRM and HR software applications that contain much of this data. Events inside these systems would make an API call to the data acquisition system to notify it of the details of the interaction. External systems for chat (i.e., Hipchat, Slack), for issue tracking (JIRA), or for version control (GitHub, BitBucket) typically have an API that would be available to a suitably configured data acquisition engine. Collecting data regarding emails may be accomplished by using a plugin on a mail server (e.g., some type of modification to an email header to redirect messages to a processing module).

Note that in addition to the data analysis or modeling techniques mentioned, sentiment analysis may provide a basis for evaluating or monitoring an organization and its members. In this case sentiment analysis refers to a Natural Language Processing (NLP) based evaluation of one or more communications to measure or determine the "mood" of an interaction, thereby allowing the tracking and visualizing of positive and negative messages. Sentiment analysis may be particularly useful in identifying when a change in mood or opinion occurs as evidenced by changes in the content, timing, or frequency of a specific interaction or a group of interactions, as this may be of importance in determining churn risk, etc.

Figure 7:
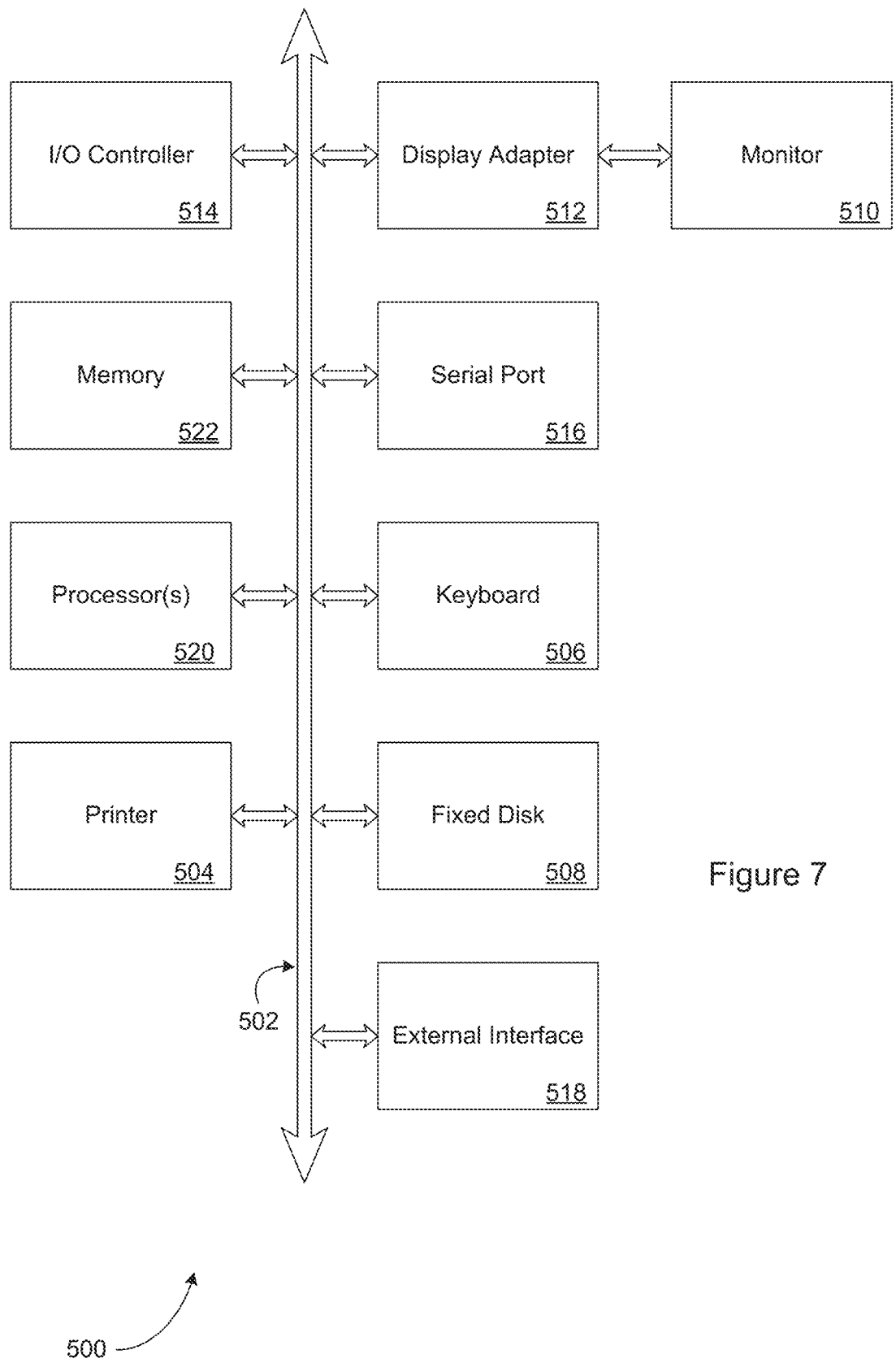
FIG. 7 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for processing information regarding relationships and interactions to assist in making organizational decisions may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 7 is a diagram illustrating elements or components that may be present in a computer device or system 700 configured to implement a method, process, function, or operation in accordance with an embodiment of the invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A computer-implemented method for assisting in making organizational decisions, comprising:
    in response to a user interaction with a graphical user interface associated with an organizational decision recommendation tool, wherein the organizational decision recommendation tool is associated with a computer application running on a computing device comprising a processor for executing instructions from a memory, identifying, by the processor, one or more sources of information regarding interactions involving a first set of employees of an organization;
    accessing, by the processor, the one or more sources of information and identifying, by the processor, data regarding interactions involving the first set of employees of the organization for further analysis and evaluation;
    processing, by the processor, at least some of the identified data to determine a first set of characteristics of the interactions involving the first set of employees of the organization;
    applying, by the processor, a data analysis, modeling, or decision process to the determined first set of characteristics to identify a second set of employees of the organization from the first set of employees that are most likely to have a second set of selected characteristics of interactions involving the second set of employees of the organization, wherein the second set of employees of the organization are those that interacted with one or more persons of the organization who attended a meeting where predetermined projects or tasks of the organization were discussed, wherein the second set of selected characteristics includes an indication of a topic of interactions involving the second set of employees of the organization;
    generating, by the processor, a display on the graphical user interface illustrating the second set of employees of the organization;
    generating, by the processor, a representation on the graphical user interface of the second set of selected characteristics of interactions involving the second set of employees of the organization, wherein the representation illustrates two or more characteristics of the interactions involving the second set of employees of the organization such that a length of a line in the representation connecting two members of the second set of employees indicates a significance of interactions between the two members of the second set of employees and a thickness of the line connecting the two members of the second set of employees indicates a number of interactions between the two members of the second set of employees;
    comparing, by the user, the representation of the second set of selected characteristics of interactions involving the second set of employees of the organization to information regarding a task management of the organization;
    based on the data analysis, modeling, or decision process, identifying, by the processor, one or more indicators of organizational actions;
    presenting, by the processor, the one or more indicators of organizational actions to the user via the display on the graphical user interface associated with the organizational decision recommendation tool; and
    altering, by the user, an aspect of the task management of the organization based on the one or more indicators of organizational actions to facilitate organizational behavior by selecting an appropriate employee for participation in a specific task.

2. The method of claim 1, wherein the one or more indicators of organizational actions include one or more of:
    resignation of a key employee of the organization;
    an increase in the employee churn rate of the organization;
    a possible reason for a lack of operational effectiveness or efficiency of the organization;
    one or more factors associated with a successful task or project completion of the organization;
    one or more indicators of under recognized influencers within the organization;
    an employee of the organization most likely to have the second set of selected characteristics of interactions or an understanding of a task or project of the organization;
    one or more potentially effective communication channels within the organization; or
    a training or development opportunity for an employee of the organization that the organization may wish to encourage.

3. The method of claim 1, wherein the second set of selected characteristics of interactions involving the second set of employees of the organization is one of a measure of the frequency of interactions involving the second set of employees of the organization, or be associated with, the second set of selected characteristics of interactions involving the second set of employees of the organization, or an indication of a primary form of interaction involving the second set of employees of the organization.

4. The method of claim 3, wherein at least two characteristics of the interactions involving the second set of employees of the organization are indicated in contrast to each other.

5. The method of claim 1, wherein the sources of information regarding interactions between the first set of employees of the organization include one or more of email, text messages, calendar appointments, news sources, or social network content.

6. The method of claim 1, wherein the interactions between the first set of employees of the organization include one or more of attendance at a meeting of the organization, participation in a task of the organization, membership in a group or team of the organization, or an exchange of verbal or text communications.

7. The method of claim 1, wherein the determined first set of characteristics of the interactions involving the first set of employees of the organization include one or more of a type of interaction involving the first set of employees of the organization, a number of interactions involving the first set of employees of the organization, a frequency of interactions involving the first set of employees of the organization, a topic of interactions involving the first set of employees of the organization, or an indication of the directional flow of one or more interactions involving the first set of employees of the organization.

8. The method of claim 1, wherein the applied data analysis, modeling, or decision process includes one or more of machine learning, statistical analysis, construction of a mathematical model, construction of a neural network, or pattern matching.

9. The method of claim 1, wherein identifying data regarding interactions involving the first set of employees of the organization for further analysis and evaluation further compries applying one or more of a filter, a threshold, a smoothing operation, or a search query to the accessed one or more sources of information.

10. The method of claim 1, further comprising:
accessing data representing one or more operational aspects of the organization; and
determining the relevance of the accessed data representing one or more operational aspects of the organization to the interactions involving the second set of employees of the organization, wherein the accessed data representing one or more operational aspects of the organization includes one or more of data related to enterprise resource planning (ERP), customer relationship management (CRM), human resources (HR), eCommerce, or the financial operations of the organization.

11. A computing system for providing an organizational decision recommendation tool for assisting in making organizational decisions, comprising:
a data storage element;
a processor programmed with a set of instructions from the data storage element, wherein when executed by the processor, the instructions cause the system to:
in response to a user interaction with a graphical user interface associated with an organizational decision recommendation tool, wherein the organizational decision recommendation tool is associated with a computer application running on a computing device comprising a processor for executing instructions from a memory, identify, by the processor, one or more sources of information regarding interactions involving a first set of employees of an organization;
access, by the processor, the one or more sources of information and identify, by the processor, data regarding interactions involving the first set of employees of the organization for further analysis and evaluation;
process, by the processor, at least some of the identified data to determine a first set of characteristics of the interactions involving the first set of employees of the organization;
apply, by the processor, a data analysis, modeling, or decision process to the determined first set of characteristics to identify a second set of employees of the organization from the first set of employees that are most likely to have a second set of selected characteristics of interactions involving the second set of employees of the organization, wherein the second set of employees of the organization are those that interacted with one or more persons of the organization who attended a meeting where predetermined projects or tasks of the organization were discussed, wherein the second set of selected characteristics includes an indication of a topic of interactions involving the second set of employees of the organization;
generate, by the processor, a display on the graphical user interface illustrating the second set of employees of the organization;
generate, by the processor, a representation on the graphical user interface of the second set of selected characteristics of interactions involving the second set of employees of the organization, wherein the representation illustrates two or more characteristics of the interactions involving the second set of employees of the organization such that a length of a line in the representation connecting two members of the second set of employees indicates a significance of interactions between the two members of the second set of employees and a thickness of the line connecting the two members of the second set of employees indicates a number of interactions between the two members of the second set of employees;
compare, by the user, the representation of the second set of selected characteristics of interactions involving the second set of employees of the organization to information regarding a task management, of the organization;
based on the data analysis, modeling, or decision process, identify, by the processor, one or more indicators of organizational actions;
present, by the processor, the one or more indicators of organizational actions to the user via the display on the graphical user interface associated with the organizational decision recommendation tool; and
alter, by the user, an aspect of the task management of the organization based on the one or more indicators of organizational actions to facilitate organizational behavior by selecting an appropriate employee for participation in a specific task.

12. The computing system of claim 11, further comprising one or more business related data processing applications installed in the system, wherein the one or more business related data processing applications include one or more of an enterprise resource planning (ERP), customer relationship management (CRM), human resources management (HR), or eCommerce application.

13. The computing system of claim 11, wherein the one or more indicators of organizational actions include one or more of:
resignation of a key employee of the organization;
an increase in the employee churn rate of the organization;
a possible reason for a lack of operational effectiveness or efficiency of the organization;

one or more factors associated with a successful task or project completion of the organization;
one or more indicators of under recognized influencers within the organization;
an employee of the organization most likely to have the second set of selected characteristics of interactions or an understanding of a task or project of the organization;
one or more potentially effective communication channels within the organization; or
a training or development opportunity for an employee of the organization that the organization may wish to encourage.

14. The computing system of claim 11, wherein the second set of selected characteristics of interactions involving the second set of employees of the organization is one of a measure of the frequency of interactions involving the second set of employees of the organization, or be associated with, the second set of selected characteristics of interactions involving the second set of employees of the organization, or an indication of a primary form of interaction involving the second set of employees of the organization.

15. The computing system of claim 11, wherein the sources of information regarding interactions between the first set of employees of the organization include one or more of email, text messages, calendar appointments, news sources, or social network content.

16. The computing system of claim 11, wherein the interactions between the first set of employees of the organization include one or more of attendance at a meeting of the organization, participation in a task of the organization, membership in a group or team of the organization, or an exchange of verbal or text communications.

17. The computing system of claim 11, wherein the determined first set of characteristics of the interactions involving the first set of employees of the organization include one or more of a type of interaction involving the first set of employees of the organization, a number of interactions involving the first set of employees of the organization, a frequency of interactions involving the first set of employees of the organization, a topic of interactions involving the first set of employees of the organization, or an indication of the directional flow of one or more interactions involving the first set of employees of the organization.

18. The computing system of claim 11, wherein the one or more sources of information regarding interactions include information regarding one or more of sales of the organization, sales velocity of the organization, revenue of the organization, profit of the organization, employee count of the organization, number of transactions processed by the organization, transaction processing rate of the organization, inventory levels of the organization, number of sales leads of the organization, or degree of completion of certain tasks or goals of the organization.

19. The computing system of claim 11, wherein the applied data analysis, modeling, or decision process includes one or more of machine learning, statistical analysis, construction of a mathematical model, construction of a neural network, or pattern matching.

20. The computing system of claim 11, wherein identifying data regarding interactions involving the first set of employees of the organization for further analysis and evaluation further comprises applying one or more of a filter, a threshold, a smoothing operation, or a search query to the accessed one or more sources of information.

21. A non-transitory computer-readable medium on which is included a set of computer-executable instructions, which when executed by a processor implement a method for assisting in making organizational decisions, the method comprising:
in response to a user interaction with a graphical user interface associated with an organizational decision recommendation tool, wherein the organizational decision recommendation tool is associated with a computer application running on a computing device comprising a processor for executing instructions from a memory, identifying, by the processor, one or more sources of information regarding interactions involving a first set of employees of an organization, wherein the one or more sources of information regarding interactions involving the first set of employees of the organization include one or more of email, text messages, calendar appointments, news sources, or social network content;
accessing, by the processor, the one or more sources of information and identifying, by the processor, data regarding interactions involving the first set of employees of the organization for further analysis and evaluation;
processing, by the processor, at least some of the identified data to determine a first set of characteristics of the interactions involving the first set of employees of the organization;
applying, by the processor, a data analysis, modeling, or decision process to the determined first set of characteristics to identify a second set of employees of the organization from the first set of employees that are most likely to have a second set of selected characteristics of interactions involving the second set of employees of the organization, wherein the second set of employees of the organization are those that interacted with one or more persons of the organization who attended a meeting where predetermined projects or tasks of the organization were discussed, wherein the second set of selected characteristics includes an indication of a topic of interactions involving the second set of employees of the organization;
generating, by the processor, a display on the graphical user interface illustrating the second set of employees of the organization;
generating, by the processor, a representation on the graphical user interface of the second set of selected characteristics of interactions involving the second set of employees of the organization, wherein the representation illustrates two or more characteristics of the interactions involving the second set of employees of the organization such that a length of a line in the representation connecting two members of the second set of employees indicates a significance of interactions between the two members of the second set of employees and a thickness of the line connecting the two members of the second set of employees indicates a number of interactions between the two members of the second set of employees;
comparing, by the user, the representation of the second set of selected characteristics of interactions involving the second set of employees of the organization to information regarding a task management, of the organization;
based on the data analysis, modeling, or decision process, identifying, by the processor, one or more indicators of organizational actions;
presenting, by the processor, the one or more indicators of organizational actions to the user via the display on the graphical user interface associated with the organizational decision recommendation tool; and altering, by the user, an aspect of the task management of the organization based on the one or more indicators of organizational actions to facilitate organizational behavior by selecting an appropriate employee for participation in a specific task.

22. The non-transitory computer-readable medium of claim 21, wherein the one or more indicators of suggested organizational actions include one or more of:

resignation of a key employee of the organization;

an increase in the employee churn rate of the organization;

a possible reason for a lack of operational effectiveness or efficiency of the organization;

one or more factors associated with a successful task or project completion of the organization;

one or more indicators of under recognized influencers within the organization;

an employee of the organization most likely to have the second set of selected characteristics of interactions or an understanding of a task or project of the organization;

one or more potentially effective communication channels within the organization; or a training or development opportunity for an employee of the organization that the organization may wish to encourage.

23. The non-transitory computer-readable medium of claim 21, wherein the determined first set of characteristics of the interactions involving the first set of employees of the organization include one or more of a type of interaction involving the first set of employees of the organization, a number of interactions involving the first set of employees of the organization, a frequency of interactions involving the first set of employees of the organization, a topic of interactions involving the first set of employees of the organization, or an indication of the directional flow of one or more interactions involving the first set of employees of the organization.

24. The non-transitory computer-readable medium of claim 21, wherein the second set of selected characteristics of interactions involving the second set of employees of the organization is one of a measure of the frequency of interactions involving the second set of employees of the organization, or be associated with, the second set of selected characteristics of interactions involving the second set of employees of the organization, or an indication of a primary form of interaction involving the second set of employees of the organization.

* * * * *